(12) United States Patent
Teranishi et al.

(10) Patent No.: US 10,513,458 B2
(45) Date of Patent: Dec. 24, 2019

(54) METHOD FOR PRODUCING GLASS SHEET AND GLASS SHEET

(71) Applicant: Nippon Sheet Glass Company, Limited, Tokyo (JP)

(72) Inventors: Toyoyuki Teranishi, Tokyo (JP); Shuhei Murata, Tokyo (JP); Takeshi Fujiwara, Tokyo (JP); Hiroyuki Okinaka, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/031,620

(22) PCT Filed: Oct. 24, 2014

(86) PCT No.: PCT/JP2014/078404
§ 371 (c)(1),
(2) Date: Apr. 22, 2016

(87) PCT Pub. No.: WO2015/060445
PCT Pub. Date: Apr. 30, 2015

(65) Prior Publication Data
US 2016/0272536 A1 Sep. 22, 2016

(30) Foreign Application Priority Data

Oct. 25, 2013 (JP) .................................. 2013-222739

(51) Int. Cl.
*C03C 17/28* (2006.01)
*C03C 17/30* (2006.01)
(Continued)

(52) U.S. Cl.
CPC .............. *C03C 17/30* (2013.01); *B32B 17/10* (2013.01); *C03C 17/002* (2013.01); *C03C 17/28* (2013.01);
(Continued)

(58) Field of Classification Search
CPC ............ C03C 17/028–328; B05D 1/30; B05D 1/305; B32B 17/064; B32B 17/10;
(Continued)

(56) References Cited

U.S. PATENT DOCUMENTS 4,822,639 A * 4/1989 Fujii ....................... B05C 11/08
118/52
5,556,667 A * 9/1996 Teranishi ................. B05D 1/32
427/164
(Continued)

FOREIGN PATENT DOCUMENTS

JP 7-157336 A 6/1995
JP 10-296172 A 11/1998
(Continued)

OTHER PUBLICATIONS

NPL on surface roughness from Mitutoyo. (Year: 2016).*
(Continued)

*Primary Examiner* — Z. Jim Yang
(74) *Attorney, Agent, or Firm* — Birch, Stewart, Kolasch & Birch, LLP

(57) ABSTRACT

An aspect of the present invention is directed to a method for producing a glass sheet with a coating, produced by applying a functional liquid for providing a function to the glass sheet, to at least one face of the glass sheet, including a first step of supplying the functional liquid to an ejection portion having a nozzle that ejects the functional liquid toward the glass sheet, and a second step of applying the functional liquid to the glass sheet while moving the glass sheet relative to the ejection portion in a fixed state such that the functional liquid ejected from the nozzle is applied to a predetermined region on the at least one face of the glass sheet, wherein a tube member that transports the functional liquid is connected to the ejection portion, and, in the first step, the
(Continued)

functional liquid is supplied by the tube member to the ejection portion.

7 Claims, 16 Drawing Sheets

(51) Int. Cl.
  *B32B 17/10* (2006.01)
  *C03C 17/00* (2006.01)
(52) U.S. Cl.
  CPC .... *B32B 2307/538* (2013.01); *C03C 2217/74* (2013.01); *C03C 2218/112* (2013.01); *Y10T 428/24355* (2015.01)
(58) Field of Classification Search
  CPC ......... B32B 17/1055–10798; B32B 2307/538; B60J 1/00–003
  See application file for complete search history.

(56) References Cited

U.S. PATENT DOCUMENTS

| | | | | |
|---|---|---|---|---|
| 5,776,545 A * | 7/1998 | Yoshiba | ............... | B05D 1/26 118/323 |
| 6,156,409 A * | 12/2000 | Doushita | ............. | B32B 27/14 427/190 |
| 2004/0013811 A1* | 1/2004 | Muranaka | ............ | B05D 1/28 427/402 |
| 2005/0100667 A1* | 5/2005 | Mayer | ............... | C03C 17/002 427/248.1 |
| 2006/0147633 A1* | 7/2006 | Jones | ............... | B05C 5/00 427/299 |
| 2007/0148419 A1* | 6/2007 | Wiedemann | ...... | B32B 17/10036 428/198 |
| 2007/0295711 A1* | 12/2007 | Striegler | ............. | C03C 8/18 219/448.11 |
| 2009/0007490 A1 | 1/2009 | Muromachi et al. | | |
| 2009/0047419 A1* | 2/2009 | Miura | ............... | B41J 2/162 427/10 |
| 2010/0310778 A1* | 12/2010 | Shioi | ............... | B05B 12/04 427/424 |
| 2011/0059254 A1* | 3/2011 | Somada | ............... | G03C 1/74 427/420 |
| 2013/0135741 A1* | 5/2013 | Lee | ............... | G02B 1/11 359/580 |
| 2013/0309448 A1* | 11/2013 | Striegler | ............ | C03C 17/322 428/141 |
| 2014/0242291 A1* | 8/2014 | Joos | ............... | C03C 17/002 427/510 |
| 2015/0103123 A1* | 4/2015 | Chen | ............... | C03C 17/002 347/102 |
| 2015/0174625 A1* | 6/2015 | Hart | ............... | B08B 17/065 428/141 |
| 2015/0329415 A1* | 11/2015 | Bellman | ............ | B32B 7/06 428/141 |
| 2016/0137549 A1* | 5/2016 | Meiss | ............... | C03C 17/007 428/141 |
| 2016/0289502 A1* | 10/2016 | O'Hare | ............... | B05D 1/02 |

FOREIGN PATENT DOCUMENTS

| | | | |
|---|---|---|---|
| JP | 2004089932 A | * | 3/2004 |
| JP | 2007137748 A | * | 6/2007 |
| JP | 2007-176443 A | | 7/2007 |
| JP | 2008-100122 A | | 5/2008 |
| JP | 2011-256060 A | | 12/2011 |

OTHER PUBLICATIONS

Extended European Search Report, dated May 22, 2017, for European Application No. 14855178.1.
International Search Report, issued in PCT/JP2014/078404, dated Dec. 16, 2014.
Written Opinion of the International Searching Authority, issued in PCT/JP2014/078404 (PCT/ISA/237), dated Dec. 16, 2014.
Japanese Notification of Reasons for Rejection for Japanese Application No. 2015-543936, dated Dec. 18, 2018, with English translation.

\* cited by examiner

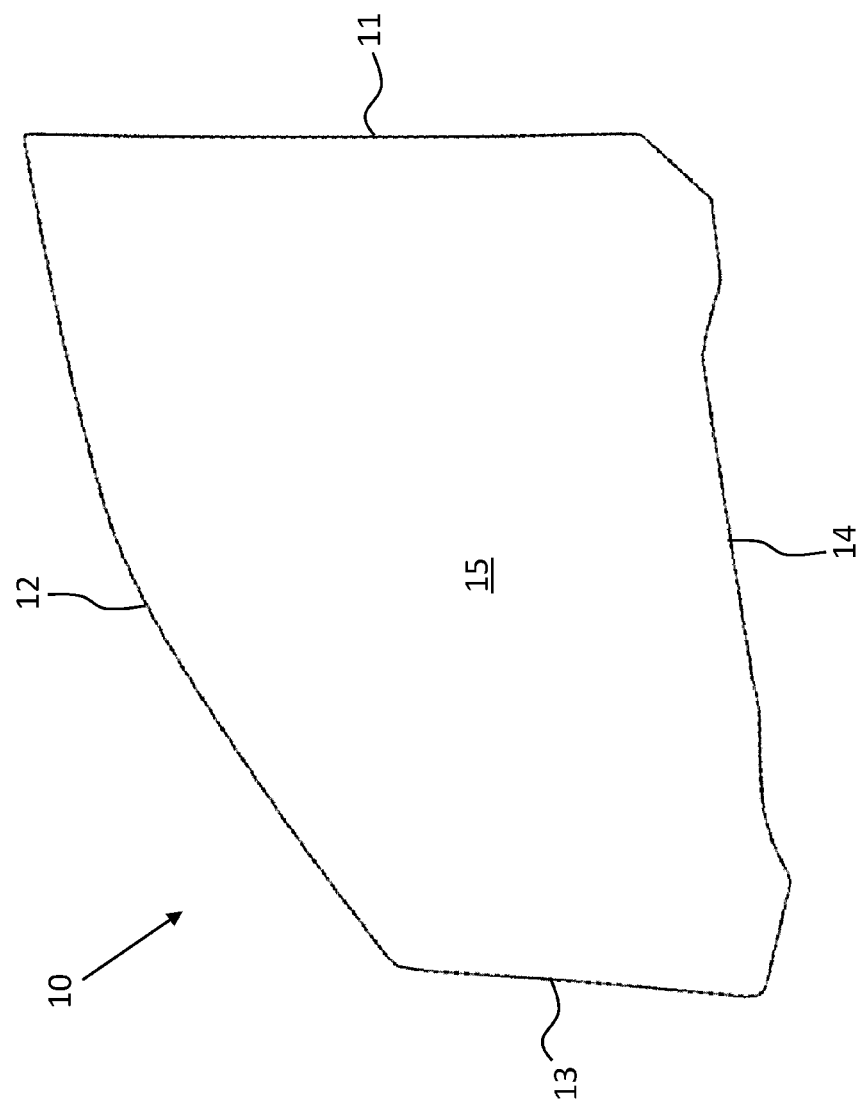

METHOD FOR PRODUCING GLASS SHEET AND GLASS SHEET

TECHNICAL FIELD

The present invention relates to a method for producing a glass sheet, and the glass sheet.

BACKGROUND ART

Conventionally, various methods have been proposed for applying a coating for UV protection or the like to automobile window glasses. For example, Patent Document 1 discloses the following method. First, an automobile window glass is held in a standing state. Then, while a nozzle for an application liquid is being moved relative to the window glass, the application liquid is ejected from the nozzle so as to be applied to the window glass. Flowing of the application liquid around from an application target face to an opposite face thereof is suppressed by fixing the position of the window glass in this manner while moving the nozzle.

CITATION LIST

Patent Literature

Patent Literature 1: JP 2011-256060A

SUMMARY OF INVENTION

Technical Problem

Incidentally, a tube member such as a rubber hose is connected to this sort of nozzle, and the application liquid is sent via this tube member to the nozzle. Thus, according to the method of Patent Literature 1, when the application liquid is ejected toward the window glass while moving the nozzle, the tube member moves in accordance with the nozzle, and thus vibration is transmitted to the nozzle, so that the application liquid may be applied to the window glass from the nozzle that is vibrating. Accordingly, an application line formed on the window glass by the applied application liquid becomes wave-like, resulting in problems in which the appearance of the window glass becomes poor, the application liquid flows around from an application target face to an opposite face thereof, and the like.

An aspect of the present invention was made in view of these circumstances, and it is an object thereof to provide a technique for suppressing undulation of an application liquid generated when applying the application liquid to a glass sheet.

Solution to Problem

In order to solve the above-described problems, the present invention adopts the following configurations.

That is to say, a first aspect of the present invention is directed to a method for producing a glass sheet with a coating, produced by applying a functional liquid for providing a function to the glass sheet, to at least one face of the glass sheet, including: a first step of supplying the functional liquid to an ejection portion having a nozzle that ejects the functional liquid toward the glass sheet; and a second step of applying the functional liquid to the glass sheet while moving the glass sheet relative to the ejection portion in a fixed state such that the functional liquid ejected from the nozzle is applied to a predetermined region on the at least one face of the glass sheet; wherein a tube member that transports the functional liquid is connected to the ejection portion, and in the first step, the functional liquid is supplied by the tube member to the ejection portion.

As a result of an in-depth study, the inventors of the present invention found that, when applying an application liquid to a glass sheet while moving a nozzle, a tube member whose weight has increased by the weight of the application liquid that is being transported thereby vibrates in accordance with the movement of the nozzle, and this vibration of the tube member is transmitted to the nozzle to cause vibration of the nozzle. Thus, according to the first aspect of the present invention, the functional liquid is applied to the glass sheet while moving the glass sheet relative to the ejection portion to which the tube member that transports the functional liquid as the application liquid is connected, in a state where the ejection portion is fixed without being allowed to move. Thus, the vibration that is generated in the tube member can be suppressed, and undulation of the application liquid generated when applying the application liquid to the glass sheet can be suppressed.

Furthermore, a second aspect of the present invention is directed to the method for producing a glass sheet according to the first aspect, wherein the tube member is made of a soft material. If the tube member that transports the functional liquid is made of a soft material, the tube member is likely to vibrate in accordance with the movement of the nozzle. Accordingly, if the tube member that transports the functional liquid is made of a soft material as in the second aspect of the present invention, it is expected that the above-described effect of suppressing undulation becomes large.

Furthermore, a third aspect of the present invention is directed to the method for producing a glass sheet according to the first or second aspect, wherein, in the second step, the functional liquid is applied to the face of the glass sheet by causing the functional liquid ejected onto the face of the glass sheet to flow downward. According to the third aspect of the present invention, the functional liquid can be sufficiently supplied also to a portion to which the functional liquid is not directly ejected, so that the amount of functional liquid used to apply the functional liquid to the glass sheet can be reduced.

Furthermore, a fourth aspect of the present invention is directed to the method for producing a glass sheet according to the third aspect, further including: a third step of, after the functional liquid is ejected onto the face of the glass sheet in the second step, blowing air onto the portion to which the functional liquid was ejected.

The thickness of the coating formed by causing the ejected functional liquid to flow downward on the face of the glass sheet is thin at a portion where the functional liquid is ejected and starts to flow downward, and gradually becomes thicker along the direction in which the functional liquid flows downward. That is to say, a difference between the coating thickness on a portion to which the functional liquid is ejected and the coating thickness on a portion that the functional liquid that has flowed downward reaches is large.

Incidentally, since the functional effect realized by the functional liquid depends on the coating thickness, the functional effect realized by the functional liquid may not be ensured at a portion in which the coating thickness is thin, that is, a portion to which the functional liquid is ejected. As a method for solving this problem, there is a method in which the amount of functional material added to the functional liquid in order to realize a function is increased such that the functional effect realized by the functional liquid can be ensured also in a portion in which the coating thickness is thin. However, according to this method, the proportion of functional material contained in the coating formed by the functional liquid increases. Accordingly, the mechanical strength of the coating may be lowered.

On the other hand, according to the fourth aspect of the present invention, after the functional liquid is ejected, air is blown onto the portion to which the functional liquid was ejected, and thus the portion to which the functional liquid was ejected is dried in a shorter time, and the coating thickness on the portion to which the functional liquid was ejected can be increased. Thus, the difference between the coating thickness on a portion to which the functional liquid is ejected and the coating thickness on a portion that the functional liquid that has flowed downward reaches can be suppressed. Accordingly, in the portion to which the functional liquid is applied, the functional effect realized by the functional liquid can be ensured while suppressing the amount of functional material added. Since the amount of functional material added can be suppressed, the mechanical strength of the coating can be increased.

Furthermore, a fifth aspect of the present invention is directed to the method for producing a glass sheet according to the third or fourth aspect, wherein, in the second step, the functional liquid is applied to the glass sheet in a state of standing in a vertical direction. According to the fifth aspect of the present invention, the glass sheet stands in the vertical direction, so that the functional liquid flows downward easily, and the time necessary to apply the functional liquid can be shortened. Note that the state in which the glass sheet stands in the vertical direction may refer to a state in which the angle formed by the glass sheet and the vertical direction is 0 degrees, as well as a state in which the glass sheet is slightly inclined with respect to the vertical direction. For example, the state in which the glass sheet stands in the vertical direction may refer to a state in which the angle formed by the glass sheet and the vertical direction is suppressed to 30 degrees or less, in order to prevent the functional liquid coating from being too thick.

Furthermore, a sixth aspect of the present invention is directed to the method for producing a glass sheet according to the third or fourth aspect, wherein, in the second step, the functional liquid is applied to the face of the glass sheet in a state where an upper side of the glass sheet is oriented downward in a vertical direction and the glass sheet is inclined toward the nozzle with respect to the vertical direction. With this configuration, the functional liquid can be applied not to the entire end face at the upper side of the glass sheet but to part of the end face. Accordingly, the functional liquid is not applied to the other part of the end face at the upper side of the glass sheet, and thus the end face can be prevented from being slippery when it is held during the processing. Furthermore, with this configuration, since the functional liquid is applied to the glass sheet that is inclined toward the nozzle with respect to the vertical direction, the functional liquid can be prevented from flowing around from an application target face to an opposite face thereof.

Furthermore, a seventh aspect of the present invention is directed to the method for producing a glass sheet according to any one of the first to sixth aspects, wherein, in the second step, the functional liquid is applied in an upper-lower direction of the glass sheet, by moving the glass sheet closer to or away from the nozzle in a direction in which the nozzle ejects the functional liquid. According to the seventh aspect of the present invention, the functional liquid can be applied in the upper-lower direction to the glass sheet, without moving the glass sheet in the upper-lower direction relative to the nozzle that ejects the functional liquid.

Furthermore, an eighth aspect of the present invention is directed to the method for producing a glass sheet according to any one of the first to seventh aspects, wherein an application start region from which application of the functional liquid is started is defined on the face of the glass sheet, and in the second step, after the glass sheet has moved to a position where the functional liquid ejected from the nozzle will hit the application start region, ejection of the functional liquid from the nozzle is started. According to the eighth aspect of the present invention, ejection of the functional liquid from the nozzle is started after the glass sheet has moved to a position where the functional liquid hits the application start region, so that the ejection of superfluous functional liquid that does not hit the glass sheet is suppressed.

Furthermore, a ninth aspect of the present invention is directed to the method for producing a glass sheet according to any one of the first to eighth aspects, wherein, in the second step, an application line along a region onto which the functional liquid was ejected is formed on the face of the glass sheet, and the application line is formed along at least part of a peripheral edge of the glass sheet. According to the ninth aspect of the present invention, the application line is formed on the face of the glass sheet while suppressing undulation of the application liquid generated when applying the application liquid to the glass sheet. Thus, according to the ninth aspect of the present invention, the possibility that a wave-like application line is formed making the appearance of the glass sheet poor can be reduced. Furthermore, the application line can be formed along an application target line. That is to say, the level of precision for the position at which the application line is to be formed can be improved.

Furthermore, a tenth aspect of the present invention is directed to a method for producing a glass sheet with a coating, produced by applying a functional liquid for providing a function to the glass sheet, to at least one face of the glass sheet, including: a first step of supplying the functional liquid to an ejection portion having a nozzle that ejects the functional liquid toward the glass sheet; a second step of applying the functional liquid to the at least one face of the glass sheet, by ejecting the functional liquid onto the face of the glass sheet while moving the glass sheet relative to the ejection portion such that the functional liquid ejected from the nozzle is applied to a predetermined region on the face of the glass sheet, and causing the functional liquid ejected onto the face of the glass sheet to flow downward; and a third step of, after the functional liquid is ejected onto the face of the glass sheet in the second step, blowing air onto the portion to which the functional liquid was ejected.

Conventionally, the entire face of a glass sheet is dried after application of the application liquid to the face of the glass sheet is completed. Accordingly, the application liquid flows downward from the portion to which the application liquid is ejected onto the face of the glass sheet, resulting in a problem in which the thickness of the coating formed by the application liquid is thin at a portion where the application liquid is ejected and starts to flow downward, and gradually becomes thicker along the direction in which the application liquid flows downward. That is to say, there is a problem in which a difference between the coating thickness on a portion to which the application liquid is ejected and the coating thickness on a portion that the application liquid that has flowed downward reaches is large.

Incidentally, since the functional effect realized by the functional liquid depends on the coating thickness, the functional effect realized by the functional liquid may not be ensured at a portion in which the coating thickness is thin, that is, a portion to which the functional liquid is ejected. As a method for solving this problem, there is a method in which the amount of functional material added to the functional liquid in order to realize a function is increased such that the functional effect realized by the functional liquid can be ensured also in a portion in which the coating thickness is thin. However, according to this method, the proportion of functional material contained in the coating formed by the functional liquid increases. Accordingly, the mechanical strength of the coating may be lowered.

On the other hand, according to the tenth aspect of the present invention, after the functional liquid as the application liquid is ejected, air is blown onto the portion to which the functional liquid was ejected, and thus the portion to which the functional liquid was ejected is dried in a shorter time, and the coating thickness on this portion can be increased. Thus, in the portion onto which the functional liquid was applied, the functional effect realized by the functional liquid can be ensured while suppressing the amount of functional material added. Since the amount of functional material added can be suppressed, the mechanical strength of the coating can be increased.

Furthermore, an eleventh aspect of the present invention is directed to a glass sheet, including: an application line formed in a step in which a functional liquid for providing a function to the glass sheet is applied to a face of the glass sheet, the application line being on the face of the glass sheet along a region to which the functional liquid was ejected; and a coating formed by causing the functional liquid ejected onto the application line to flow downward, wherein a difference in coating thickness in a range within 1 mm from the application line in a direction in which the functional liquid flows downward is 1.2 μm or less. According to the eleventh aspect of the present invention, the difference in coating thickness near the application line is suppressed to 1.2 μm or less, and thus distortion due to the difference in coating thickness is suppressed, and the appearance at the application line can be improved.

Furthermore, a twelfth aspect of the present invention is directed to a glass sheet, including: an application line formed in a step in which a functional liquid for providing a function to the glass sheet is applied to a face of the glass sheet, the application line being on the face of the glass sheet along a region to which the functional liquid was ejected; and a coating formed by causing the functional liquid ejected onto the application line to flow downward, wherein a local maximum that appears in a coating thickness first from the application line in a direction in which the functional liquid flows downward is 3.2 μm or less.

The functional liquid coating is formed by causing the functional liquid to flow downward from the application line. Accordingly, the coating hardly forms on the opposite side of the direction in which the functional liquid flows downward, and the coating appears from a region near the application line. Accordingly, if the local maximum that appears in the coating thickness first in the direction in which the functional liquid flows downward from the application line is large, a gap between a region without the coating and a region having this local maximum increases. Thus, light that is transmitted through the glass sheet is likely to be refracted, and the appearance near the application line may be poor. On the other hand, according to the twelfth aspect, the local maximum that appears in the coating thickness first in the direction in which the functional liquid flows downward from the application line can be suppressed to 3.2 μm or less, and thus the appearance near the application line can be prevented from being poor.

Furthermore, a thirteenth aspect of the present invention is directed to a glass sheet, including: an application line formed in a step in which a functional liquid for providing a function to the glass sheet is applied to a face of the glass sheet, the application line being on the face of the glass sheet along a region to which the functional liquid was ejected; and a coating formed by causing the functional liquid ejected onto the application line to flow downward, wherein a local maximum that appears in a coating thickness first from the application line in a direction in which the functional liquid flows downward is 2.8 μm or less. According to the thirteenth aspect, the local maximum that appears in the coating thickness first in the direction in which the functional liquid flows downward from the application line can be suppressed more than in the twelfth aspect, so that the appearance near the application line can be further improved.

Furthermore, a fourteenth aspect of the present invention is directed to a glass sheet, including: an application line formed in a step in which a functional liquid for providing a function to the glass sheet is applied to a face of the glass sheet, the application line being on the face of the glass sheet along a region to which the functional liquid was ejected; and a coating formed by causing the functional liquid ejected onto the application line to flow downward, wherein the coating in a vicinity of the application line within 1.2 mm therefrom in a direction in which the functional liquid flows downward is such that a variation in a coating thickness from a local maximum is suppressed to 0.25 μm or less, the variation being generated in a range having a smaller variation amount in the coating thickness, of a range within 0.1 mm downward from a position at the local maximum of the coating thickness, in the direction in which the functional liquid flows downward, and a range within 0.1 mm upward from the position at the local maximum of the coating thickness, in the direction in which the functional liquid flows downward.

When forming a coating on a face of the glass sheet by causing the functional liquid to flow downward from the application line, the coating thickness varies significantly near the application line. If the coating thickness varies significantly, the surface of the coating formed on the face of the glass sheet has a relatively sharp concave-convex shape. Thus, light transmitted therethrough is likely to be distorted, and the appearance near the application line may be poor. On the other hand, according to the fourteenth aspect, in the vicinity of the application line within 1.2 mm therefrom in the direction in which the functional liquid flows downward, the variation in the coating thickness from a local maximum is suppressed to 0.25 μm or less, the variation being generated in the range having a smaller variation amount in the coating thickness, of the range within 0.1 mm downward from the position at the local maximum of the coating thickness, in the direction in which the functional liquid flows downward, and the range within 0.1 mm upward from the position at the local maximum of the coating thickness, in the direction in which the functional liquid flows downward. Accordingly, the possibility of this sort of distortion occurring is reduced, and the appearance near the application line can be prevented from being poor.

Furthermore, a fifteenth aspect of the present invention is directed to a glass sheet, including: an application line formed in a step in which a functional liquid for providing a function to the glass sheet is applied to a face of the glass sheet, the application line being on the face of the glass sheet along a region to which the functional liquid was ejected; and a coating formed by causing the functional liquid ejected onto the application line to flow downward, wherein the coating in a vicinity of the application line within 1.2 mm therefrom in a direction in which the functional liquid flows downward is such that differences between local maximums that appear in a coating thickness second and thereafter from the application line in the direction in which the functional liquid flows downward, and local minimums adjacent to the local maximums that appear in the coating thickness second and thereafter are 0.3 jam or less, except for a local maximum that appears in the coating thickness first from the application line in the direction in which the functional liquid flows downward.

As described above, when forming a coating on a face of the glass sheet by causing the functional liquid to flow downward from the application line, the coating thickness varies significantly near the application line, and thus light transmitted therethrough is likely to be distorted, and the appearance near the application line may be poor. In particular, if the differences between the local maximums that appear in the coating thickness second and thereafter in the direction in which the functional liquid flows downward from the application line and the local minimums adjacent to the local maximums that appear in the coating thickness second and thereafter are large, distortion occurs over a wide range in the direction in which the functional liquid flows from the application line, and the appearance near the application line may be poor.

On the other hand, with this configuration, in the vicinity of the application line within 1.2 mm therefrom in the direction in which the functional liquid flows downward, the differences between the local maximums that appear in the coating thickness second and thereafter in the direction in which the functional liquid flows downward from the application line and the local minimums adjacent to the local maximums that appear in the coating thickness second and thereafter are suppressed to 0.3 μm or less. Accordingly, the possibility of this sort of distortion occurring is reduced, and the appearance near the application line can be prevented from being poor.

Furthermore, a sixteenth aspect of the present invention is directed to a glass sheet to which a functional liquid for providing a predetermined function has been applied, including: an application line formed on a face of the glass sheet along a region to which the functional liquid was ejected; and a coating formed from the application line to part of an end face at an upper side of the glass sheet. With this configuration, the functional liquid is applied not to the entire end face at the upper side of the glass sheet but to part of the end face. Accordingly, the functional liquid is not applied to the other part of the end face at the upper side of the glass sheet, and thus the end face can be prevented from being slippery when it is held during the processing.

Advantageous Effects of Invention

According to the present invention, it is possible to suppress undulation of an application liquid generated when applying the application liquid to a glass sheet.

BRIEF DESCRIPTION OF DRAWINGS

FIG. 1A is a front view showing an example of a glass sheet according to an embodiment;

DESCRIPTION OF EMBODIMENTS

Hereinafter, an embodiment according to an aspect of the present invention (hereinafter, also referred to as the "embodiment") will be described with reference to the drawings. Note that the embodiment described below is in all aspects merely an example of the present invention. It will be appreciated that various improvements and modifications can be made without departing from the scope of the present invention. That is to say, specific configurations may be adopted as appropriate depending on the mode of implementation of the present invention.

§ 1 Configuration Example

Glass Sheet

Figure 1B:
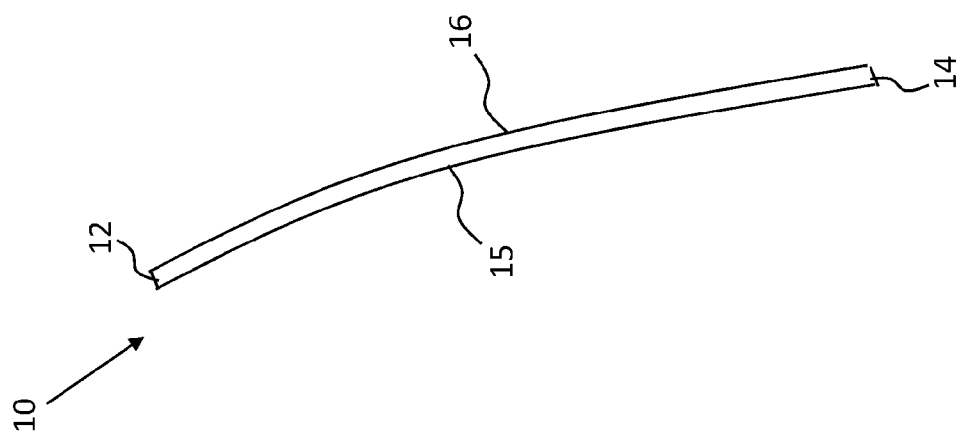
FIG. 1B is a side view showing an example of the glass sheet according to the embodiment.

First, a glass sheet 10 used in this embodiment will be described with reference to FIGS. 1A and 1B. FIG. 1A is a front view showing an example of the glass sheet 10 according to this embodiment. FIG. 1B is a side view showing an example of the glass sheet 10 according to this embodiment. Note that, for the sake of ease of description, the upper-lower direction in FIGS. 1A and 1B is referred to as "upper-lower", the right direction in FIG. 1A and the frontward side of the sheet of FIG. 1B are referred to as "right", the left direction in FIG. 1A and the inner side of the sheet of FIG. 1B are referred to as "left", the frontward side of the sheet of FIG. 1A and the left direction in FIG. 1B are referred to as "front", and the inner side of the sheet of FIG. 1A and the right direction in FIG. 1B are referred to as "rear".

The glass sheet 10 according to this embodiment is a glass sheet that can be used as a window glass attached to a window of a front or rear door of an automobile, and is formed in a shape according to the door to which the glass is to be attached. As shown in the example in FIG. 1A, the glass sheet 10 has a first side 11 as a right side extending in the upper-lower direction, and further has a second side 13 that is shorter than the first side 11 as a left side opposite to the first side 11.

Furthermore, an upper side 12 in the shape of a slightly curved line is formed between the upper end of the first side 11 and the upper end of the second side 13. The angle formed by the first side 11 and the upper side 12 is smaller than 90 degrees, and the angle formed by the second side 13 and the upper side 12 is larger than 90 degrees. The glass sheet 10 is attached to a door of an automobile such that the upper side 12 is positioned on the upper side. Accordingly, in a state where the door window is closed by the glass sheet 10, a predetermined region extending downward from the upper side 12 is a region that is accommodated in a glass run attached to the upper portion of the door window.

Furthermore, a lower side 14 in the shape of a line bent at a plurality of points is formed between the lower end of the first side 11 and the lower end of the second side 13. The lower side 14 has portions projecting downward respectively near the first side 11 and near the second side 13. In this embodiment, in a state where the glass sheet 10 is attached to the door window, the lower side 14 of the glass sheet 10 is attached to a window regulator. Accordingly, a predetermined region extending upward from the lower side 14 is a region that is accommodated in the door even in a state where the door window is closed by the glass sheet 10.

Furthermore, as shown in the example in FIGS. 1A and 1B, the glass sheet 10 has a first face 15 that is inside the automobile and a second face 16 that is outside the automobile, and has a shape curved rearward such that the first face 15 is concave and the second face 16 is convex. The glass sheet 10 as described above is made of, for example, normal green glass, UV-protection normal green glass, clear glass, heat-absorbing glass, or the like.

Application System

Figure 2:
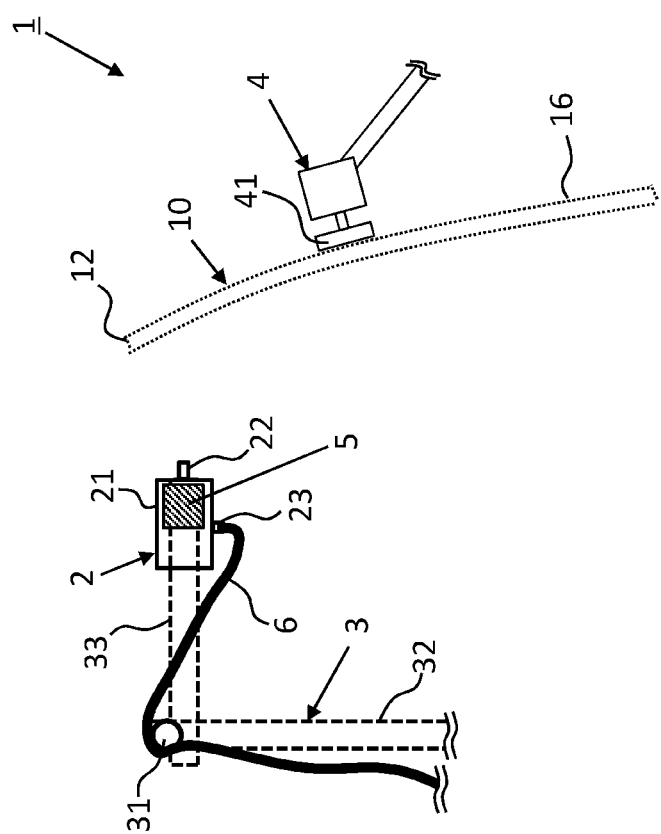
FIG. 2 shows an example of an application system according to the embodiment.

Next, an application system 1 for applying a functional liquid to the glass sheet 10 will be described with reference to FIG. 2. FIG. 2 shows an example of the application system 1 according to this embodiment.

The application system 1 according to this embodiment is a system for producing a glass sheet with a coating by applying a functional liquid to the first face 15 of the glass sheet 10. As shown in the example in FIG. 2, the application system 1 includes an ejection portion 2 that ejects a functional liquid, a robot arm 4 that holds and moves the glass sheet 10, and an air blowing unit 5 that blows air onto the glass sheet 10.

The functional liquid is a liquid to which a functional material for providing a function to the glass sheet 10 has been added. For example, the functional liquid is preferably an ultraviolet-protection coating liquid for providing an ultraviolet-protection function to the glass sheet 10, and other examples of the functional liquid may include an infrared (IR)-protection coating liquid, an antifog coating liquid, a water-repelling coating liquid, an antifouling coating liquid, a low-reflective coating liquid, an electromagnetic-shielding coating liquid, a coloring coating liquid, and the like.

The ejection portion 2 has a nozzle 22 that is oriented toward the glass sheet 10, a base portion 21 that supports the nozzle 22, and a connection portion 23 that introduces the functional liquid into the base portion 21. A tube member 6 that supplies the functional liquid is connected to the connection portion 23. The functional liquid from a pump (not shown) or the like that sends out the functional liquid is supplied by the tube member 6 to the ejection portion 2. The nozzle 22 and the connection portion 23 are interconnected to each other via the base portion 21, and the functional liquid supplied by the tube member 6 is sent via the connection portion 23 and ejected from the nozzle 22.

Note that the tube member 6 is made of, for example, a soft material such as vinyl chloride, fluoropolymer resin, rubber, or the like. In this case, for example, when the inside of the tube member 6 becomes dirty, the tube member 6 can be easily replaced. Furthermore, the cost of the tube member 6 can be suppressed, and the degree of freedom in arranging the tube member 6 can be increased. However, the material for the tube member 6 is not limited to soft materials, and, for example, hard materials such as metal, resin, or the like, also may be used.

As shown in the example in FIG. 2, the ejection portion 2 is fixed by a fixing member 3. The fixing member 3 is configured by, for example, two rectangular plate members, that is, a first plate member 32 and a second plate member 33, and is in the shape of an inverted L. The first plate member 32 is a vertically extending support column, and its upper end is connected to one end of the second plate member 33 that extends in the horizontal direction. The ejection portion 2 is attached at a point near a front end of the second plate member 33.

A catch portion 31 is provided near an intersecting point of the first plate member 32 and the second plate member 33. The tube member 6 can be caught on the catch portion 31. Accordingly, the weight of tube member 6 can be partially supported by the first plate member 32 as a support column of the fixing member 3, so that vibration of the tube member 6 during transportation of the functional liquid can be reduced.

A front end of the robot arm 4 has a suction cup 41 that can suck the glass sheet 10. The robot arm 4 uses the suction cup 41 to hold the glass sheet 10, and can move the glass sheet 10 relative to the ejection portion 2 that is in a fixed state. Accordingly, the functional liquid ejected from the nozzle 22 is applied to a predetermined region on the first face 15 of the glass sheet 10.

The air blowing unit 5 is, for example, a unit for blowing air onto a portion to which the functional liquid was ejected, the unit being configured by one or a plurality of fans. As shown in the example in FIG. 2 and FIG. 5A (described later), in this embodiment, the air blowing unit 5 is arranged on a side portion of the base portion 21 of the ejection portion 2 (on a side face of the base portion 21, on the frontward side of the sheet of FIG. 2). Accordingly, after the functional liquid is ejected from the nozzle 22 to the first face 15 of the glass sheet 10, the air blowing unit 5 according to this embodiment can blow air from the front of the glass sheet 10 onto a portion to which the functional liquid was ejected.

Note that these constituent elements are controlled, for example, by a controller (not shown). The controller includes, for example, one or a plurality of processors and peripheral circuits (a ROM (read only memory), a RAM (random access memory), an interface circuit, etc.) used for processing of the processors, and operates according to a program stored in the peripheral circuits such as the ROM.

The thus configured application system 1 is used to apply the functional liquid to the first face 15 of the glass sheet 10.

§ 2 Operation Example

Figure 3:
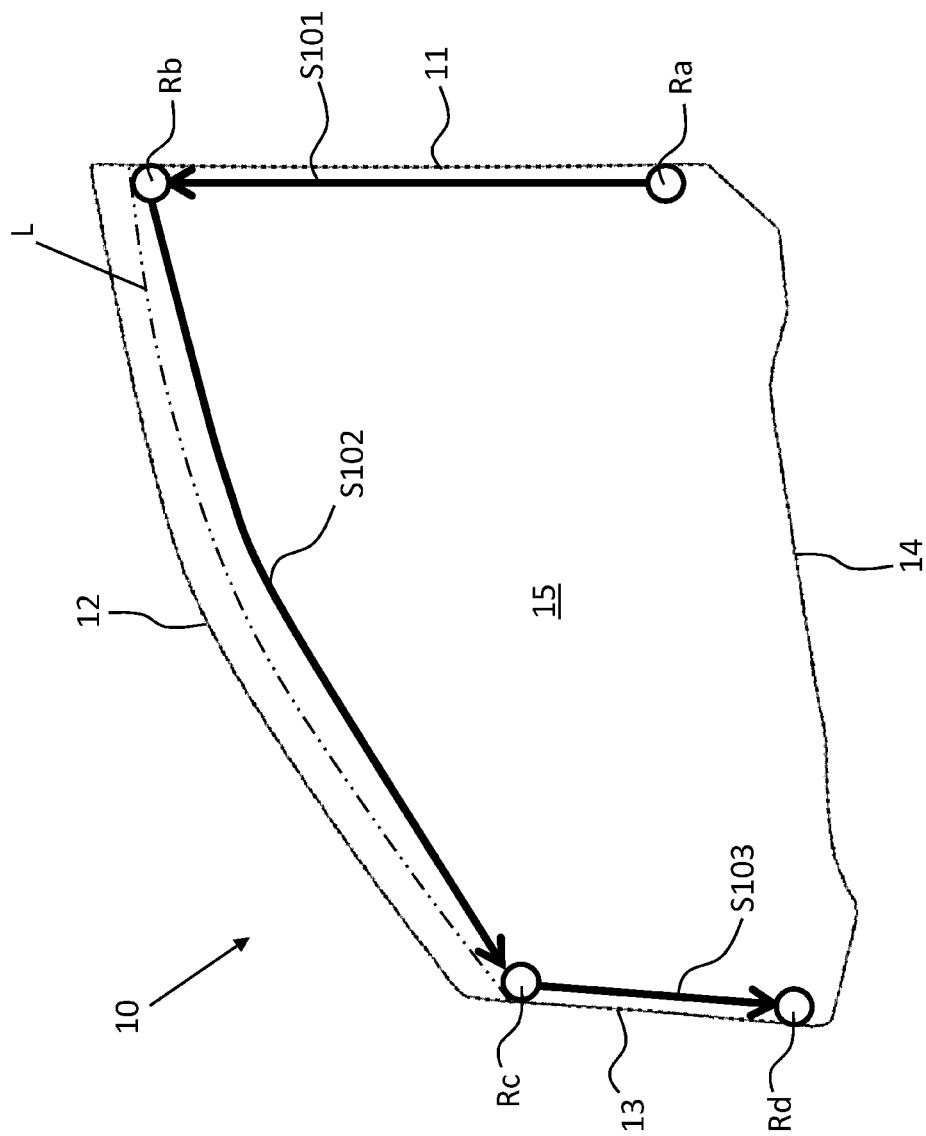
FIG. 3 shows an example of application steps according to the embodiment.
Figure 4:
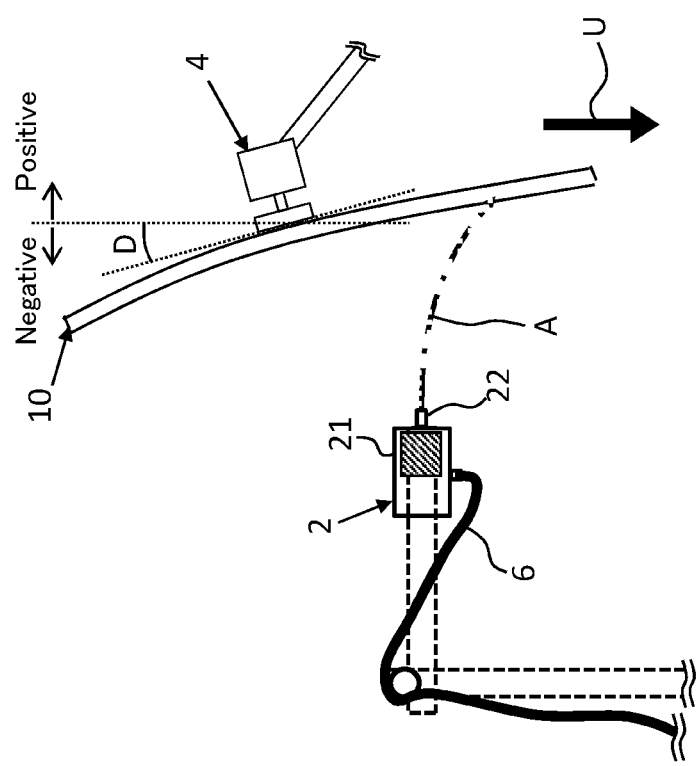
FIG. 4 shows an example of a movement direction of the glass sheet when applying the functional liquid to a first side of the glass sheet according to the embodiment.
Figure 5A:
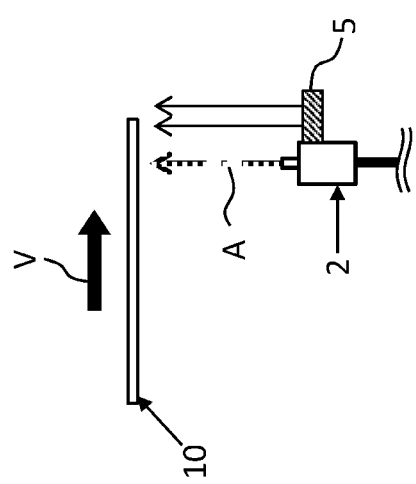
FIG. 5A shows an example of a movement direction of the glass sheet when applying the functional liquid to an upper side of the glass sheet according to the embodiment.
Figure 5B:
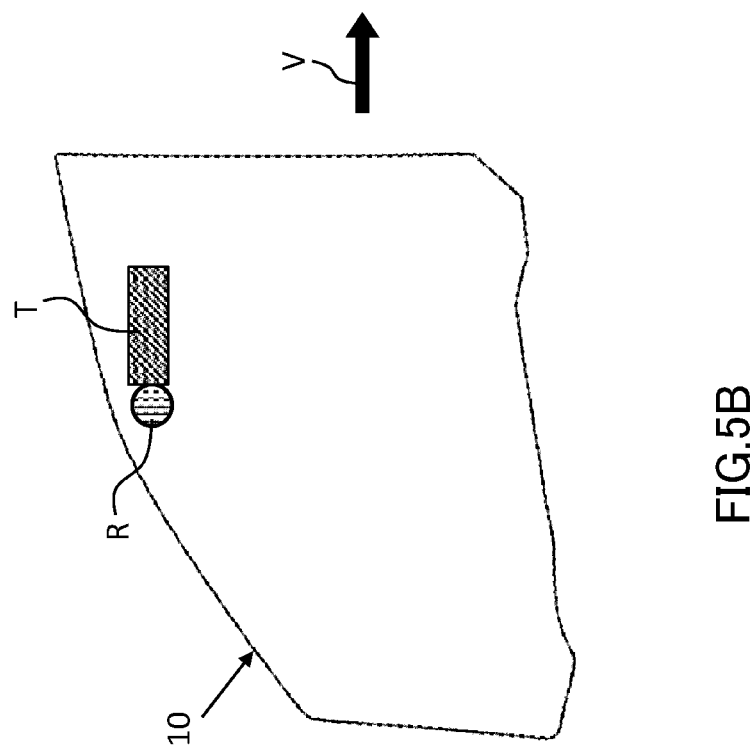
FIG. 5B shows an example of a positional relationship between a functional liquid ejection region and an air-blown region according to the embodiment.
Figure 6:
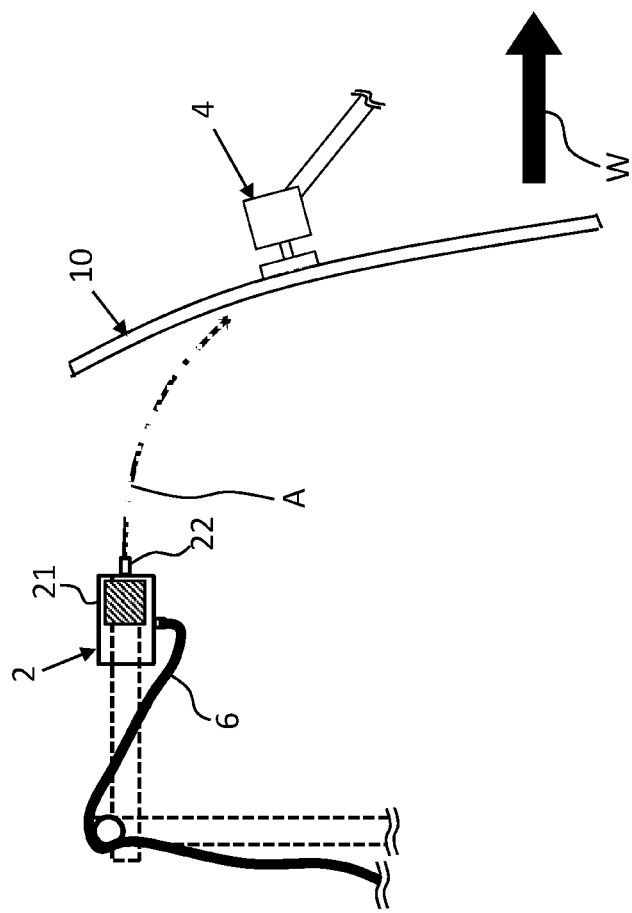
FIG. 6 shows an example of a movement direction of the glass sheet when applying the functional liquid to a second side of the glass sheet according to the embodiment.

Next, an operation that applies the functional liquid to the glass sheet 10 using the application system 1 will be described with reference to FIGS. 3 to 6. FIG. 3 shows an example of functional liquid application steps of the application system 1 according to this embodiment. FIG. 4 shows an example of a movement direction of the glass sheet 10 when applying the functional liquid along the first side 11 to the first face 15 of the glass sheet 10. FIG. 5A is a view of the glass sheet 10 from above, showing an example of a movement direction of the glass sheet 10 when applying the functional liquid along the upper side 12 to the first face 15 of the glass sheet 10. FIG. 5B shows an example of a positional relationship between a region to which the functional liquid is ejected when applying the functional liquid along the upper side 12 (hereinafter, referred to as an "ejection region") R and a region onto which air is blown by the air blowing unit 5 (hereinafter, referred to as an "air-blown region") T. FIG. 6 shows an example of a movement direction of the glass sheet 10 when applying the functional liquid along the second side 13 to the first face 15 of the glass sheet 10.

It is assumed that the glass sheet 10 to which the functional liquid is to be applied is placed, for example, in a standing state. In this embodiment, it is assumed that an application start region Ra from which application of the functional liquid is started is defined on the first face 15 of the glass sheet 10. In this case, before applying the functional liquid to the glass sheet 10, the application system 1 holds the placed glass sheet 10, using the suction cup 41 of the robot arm 4. Using the portion sucked by the suction cup 41 of the robot arm 4 as a reference, in this embodiment, the robot arm 4 holds the glass sheet 10 such that the second face 16 of the glass sheet 10 is inclined at an angle D with respect to the vertical direction. When an angle of a rotation to the right is taken as a positive angle and an angle of a rotation to the left is taken as a negative as shown in FIG. 4, in this embodiment, the range of the angle D at which the robot arm 4 holds the glass sheet 10 is, for example, −30 degrees to +30 degrees. That is to say, the robot arm 4 according to this embodiment holds the glass sheet 10 such that the angle formed by the second face 16 of the glass sheet 10 and the vertical direction is 30 degrees or less. The state in which the glass sheet 10 is held in this manner corresponds to the "state of standing in the vertical direction" of the glass sheet of the present invention. The state in which the glass sheet stands in the vertical direction in this manner may refer to a state in which the angle formed by the glass sheet and the vertical direction is 0 degrees, as well as a state in which the glass sheet is slightly inclined with respect to the vertical direction.

Next, the application system 1 controls the robot arm 4 to move the glass sheet 10 to a position where the functional liquid hits (is ejected at) the application start region Ra when ejecting the functional liquid from the nozzle 22 of the ejection portion 2. After moving the glass sheet 10 to a position where the functional liquid is ejected onto the application start region Ra, the application system 1 ejects the functional liquid in order of steps S101 to S103, which will be described below. Accordingly, in this embodiment, the ejection of superfluous functional liquid that does not hit the glass sheet 10 is suppressed, so that the functional liquid can be effectively applied to the glass sheet 10. When the application of the functional liquid is started, the air blowing by the air blowing unit 5 onto the glass sheet 10 is started as well.

In step S101, as shown in the example in FIGS. 3 and 4, the application system 1 applies the functional liquid along the first side 11 to the first face 15 of the glass sheet 10. Specifically, after ejecting the functional liquid from the nozzle 22 onto the application start region Ra, the robot arm 4 is controlled to move the glass sheet 10 downward (along the arrow U in FIG. 4). Note that the arrow A in FIG. 4 indicates the trajectory of the functional liquid ejected from the nozzle 22.

With this configuration, the application position of the functional liquid ejected from the nozzle 22 moves upward on the first face 15 in accordance with the movement of the glass sheet 10. That is to say, the application system 1 can apply the functional liquid along the first side 11 to the first face 15 of the glass sheet 10, by moving the glass sheet 10 downward in this manner. When the application position reaches a region Rb, the application system 1 advances the procedure to the subsequent step S102.

In the subsequent step S102, as shown in the example in FIGS. 3 and 5A, the application system 1 applies the functional liquid along the upper side 12 to the first face 15 of the glass sheet 10 while forming an application line L. Specifically, the application system 1 controls the robot arm 4 to move the glass sheet 10 rightward (along the arrow V in FIG. 5A), while maintaining the state of step S101 in which the functional liquid supplied via the tube member 6 is ejected from the nozzle 22. Then, when the application position of the functional liquid proceeds from the region Rb and reaches a region Rc, the application system 1 advances the procedure to the subsequent step S103.

In step S102, the functional liquid is applied while leaving some space from the upper side 12 according to the region that is in contact with the glass run when the glass sheet 10 is attached to a door window of an automobile. Accordingly, the application line L is formed on the first face 15 along the region to which the functional liquid is ejected. The application line L indicates a boundary between the region to which the functional liquid was applied and the region to which the functional liquid was not applied.

Furthermore, in step S102, the functional liquid ejected to the vicinity of the application line L flows downward, and thus the functional liquid is applied to the portion below the application line L on the first face 15. That is to say, in this embodiment, the functional liquid is applied to the portion below the application line L, using a so-called flow-coating method. Accordingly, in step S102, the functional liquid can be sufficiently supplied also to a portion to which the functional liquid is not directly ejected, and the amount of functional liquid used to apply the functional liquid to the glass sheet 10 can be reduced.

Furthermore, as shown in the example in FIG. 5B, the air blowing unit 5 is arranged on a side portion of the ejection portion 2, and thus the air-blown region T of the air blowing unit 5 is adjacent to the functional liquid ejection region R. In step S102, as shown in the example in FIGS. 5A and 5B, the robot arm 4 moves the glass sheet 10 in the direction indicated by the arrow V, and thus, immediately after the functional liquid is ejected, the air blown from the air blowing unit 5 hits the portion to which the functional liquid was ejected. As shown in the example in FIGS. 2 and 5A, the air blowing unit 5 is arranged on a side portion of the nozzle 22. Accordingly, the air blowing unit 5 can blow air along the application line L onto the front face (on the first face 15 side) of the glass sheet 10 regardless of the inclination of the glass sheet 10.

In the subsequent step S103, as shown in the example in FIGS. 3 and 6, the application system 1 applies the functional liquid along the second side 13 to the first face 15 of the glass sheet 10. Specifically, the application system 1 controls the robot arm 4 to move the glass sheet 10 away (in the direction indicated by the arrow W in FIG. 6) from the nozzle 22 along the direction in which the nozzle 22 ejects the functional liquid, while maintaining the state of step S102 in which the functional liquid is ejected from the nozzle 22.

With this configuration, the distance between the nozzle 22 and the glass sheet 10 becomes longer, and thus, as indicated by the trajectory (arrow A) of the functional liquid in FIG. 6, the application position where the functional liquid hits moves downward on the first face 15. That is to say, the application system 1 can cause the position to which the functional liquid is to be ejected to be moved downward on the first face of the glass sheet 10, without moving the glass sheet 10 upward.

The following effects can be obtained by applying the functional liquid along the second side 13 in this manner. For example, if the glass sheet 10 is moved away from the nozzle 22, the air-blown region by the air blowing unit 5 can be made larger. Accordingly, a relatively small blower may be used as the air blowing unit 5 according to this embodiment. Furthermore, for example, since the distance between the nozzle 22 and the glass sheet 10 becomes longer, the force of the functional liquid immediately before hitting the first face 15 of the glass sheet 10 becomes smaller. Accordingly, flowing of the functional liquid around to the second face 16 can be suppressed.

When the application position of the functional liquid proceeds from the region Rc and reaches a region Rd, the application of the functional liquid to the glass sheet 10 in this embodiment is ended, and the application system 1 stops the ejection of the functional liquid from the ejection portion 2. Then, the application system 1 controls the robot arm 4 to place the glass sheet 10 at a predetermined location, and ends the procedure according to this operation example. Subsequently, the application system 1 may repeat the operation and apply the functional liquid to a following glass sheet 10.

Note that, in steps S101 to S103, a step of supplying the functional liquid that is to be ejected, via the tube member 6 to the ejection portion 2, corresponds to a "first step" of the present invention. Furthermore, in steps S101 to S103, a step of ejecting the functional liquid from the ejection portion 2, thereby applying the functional liquid to the first face 15 corresponds to a "second step" of the present invention. Furthermore, in step S102, a step of moving the glass sheet 10, and causing the air blowing unit 5 to blow air onto a position to which the functional liquid was applied corresponds to a "third step" of the present invention.

Furthermore, in steps S101 to S103 above, the functional liquid is applied to a region of the first face 15, excluding the region between the upper side 12 and the application line L. Accordingly, the region to which the functional liquid is applied corresponds to a "predetermined region" to which the functional liquid is applied in the second step of the present invention.

The embodiment for producing the glass sheet 10 coated with the functional liquid as described above has the following features. First, when applying the functional liquid to the glass sheet 10 while moving the ejection portion 2 as in conventional examples, the tube member 6 whose weight has increased by the weight of functional liquid that is being transported thereby vibrates in accordance with the movement of the ejection portion 2. This vibration of the tube member 6 is transmitted to the ejection portion 2, and thus the functional liquid is ejected in a wave-like state in accordance with the vibration of the ejection portion 2, from the nozzle 22 toward the glass sheet 10.

Accordingly, when applying the functional liquid along the first side 11 as in step S101, a problem may occur in which the application liquid flows around to the second face 16. In particular, in this embodiment, the tube member 6 is made of a soft material and easily vibrates, and thus this sort of problem is likely to occur.

Thus, in this embodiment, the ejection portion 2 is fixed without being allowed to move. Therefore, the vibration that is generated in the tube member 6 is suppressed, and undulation of the functional liquid generated when applying the application liquid is suppressed. Accordingly, in step S101, even when the application system 1 applies the functional liquid along the first side 11, flowing of the functional liquid around to the second face 16 can be suppressed. With the application system 1 according to this embodiment, also in steps S102 and S103, undulation of the functional liquid generated when applying the application liquid is suppressed.

Furthermore, according to this embodiment, immediately after the functional liquid is ejected, air is blown onto the portion to which the functional liquid was ejected, in accordance with the movement of the glass sheet 10. Accordingly, the coating near the application line L is dried by the blown air, and the coating thickness can be increased. As a result, a difference between the coating thickness near the application line L and that near the lower side 14 can be suppressed.

§ 3 Modified Example

Above, an embodiment of the present invention was described in detail, but the description above is in all aspects merely an example of the present invention. It will be appreciated that various improvements and modifications can be made without departing from the scope of the present invention.

Glass Sheet

For example, regarding the above-described specific configuration of the glass sheet 10, constituent elements thereof may be omitted, changed, replaced, or added as appropriate depending on the mode of implementation. For example, although the glass sheet 10 described above has a shape curved frontward, it may be flat. Furthermore, although the glass sheet 10 described above is used as a window glass attached to a window of a front or rear door of an automobile, it may be a glass sheet that can be used as a window glass of another vehicle, or may be a glass sheet that can be used in settings other than for vehicles.

Application System

Furthermore, for example, regarding the above-described specific configuration of the application system 1, constituent elements thereof may be omitted, changed, replaced, or added as appropriate depending on the mode of implementation. For example, if air blowing onto the glass sheet 10 is not performed, the air blowing unit 5 may be omitted. Furthermore, as a means for holding and moving the glass sheet 10, a means other than the robot arm 4 may be used instead of the robot arm 4.

Furthermore, the ejection portion 2, the robot arm 4, and the air blowing unit 5 may be controlled by one controller, or at least one of these constituent elements may be controlled by another controller. The air blowing unit 5 may be, for example, a mere fan not having a controller. Furthermore, the ejection portion 2, the robot arm 4, and the air blowing unit 5 may form a system integrated by one controller, or at least one of these constituent elements may be separate.

Furthermore, in the application system 1 described above, the ejection portion 2 is fixed by the fixing member 3 in the shape of an inverted L. However, the configuration and the shape of the fixing member 3 do not have to be limited to those described above, and other configurations and shapes also may be adopted as long as the ejection portion 2 and the tube member 6 are fixed. The method for fixing the ejection portion 2 may be selected as appropriate depending on the mode of implementation.

Furthermore, in the application system 1 described above, the air blowing unit 5 is installed on a side portion of the ejection portion 2. The installation position of the air blowing unit 5 is not limited to that in the example, and may be set as appropriate depending on the mode of implementation.

Figure 7:
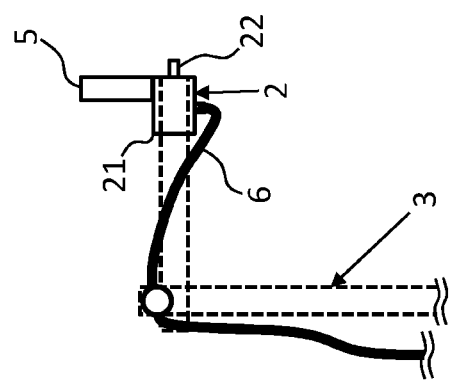
FIG. 7 shows an example of an installation position of an air blowing unit according to another embodiment.
Figure 8:
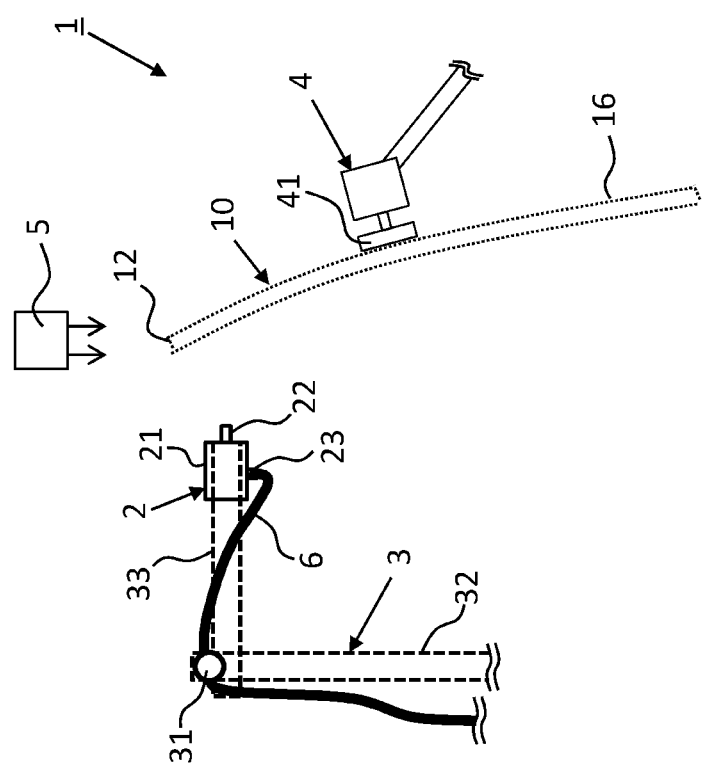
FIG. 8 shows an example of an installation position of the air blowing unit according to another embodiment.

For example, FIGS. 7 and 8 show examples of the installation position of the air blowing unit 5 according to other embodiments. In FIG. 7, the air blowing unit 5 is installed on an upper portion of the ejection portion 2. In FIG. 8, the air blowing unit 5 is installed at a position apart from the ejection portion 2. As shown in the example in FIG. 8, the air blowing unit 5 may be installed at a location other than the ejection portion 2 such that, immediately after the functional liquid is ejected, air can be blown onto the portion to which the functional liquid was ejected.

Note that, in the foregoing embodiment and FIGS. 7 and 8, the air blowing unit 5 is arranged such that, immediately after the ejection portion 2 applies the functional liquid, air can be blown onto the portion to which the functional liquid was applied. However, it is sufficient that the air blowing unit 5 is arranged such that coating thickness can be increased. For example, the air blowing unit 5 may be installed at a position where, after the functional liquid is ejected onto the first face 15 of the glass sheet 10, air can be blown onto the portion excluding the region that will be naturally dried, on the first face 15 of the glass sheet 10 to which the functional liquid was ejected, at least before the functional liquid completely flows downward.

Furthermore, as shown in the example in FIG. 5B, the air blowing unit 5 described above blows air onto the region adjacent to the functional liquid ejection region R. However, the range onto which the air blowing unit 5 can blow air (the air-blown region T) does not have to be limited to this range, and, for example, may include the functional liquid ejection region R. Furthermore, if a glass sheet is moved at 45 mm/s, the air-blown region T may be apart from the ejection region R, for example, by approximately 200 mm. As described above, if air is blown onto a region to which the functional liquid is being ejected, a difference in coating thickness near the application line may increase. Accordingly, it is preferable to blow air onto a portion to which the functional liquid is ejected, with a time interval of approximately 0.1 to 15 seconds after the functional liquid is ejected. It is particularly preferable to blow air with a time interval of 1 to 5 seconds after the functional liquid is ejected. The air-blown region T may be apart from the ejection region R, for example, so as to keep this timing.

Furthermore, the application system 1 may further include an air blowing unit for performing an air drying step of drying the entire region to which the functional liquid is applied, after the application of the functional liquid to the glass sheet 10 is ended. As the air blowing unit for performing the air drying step, the application system 1 may use the air blowing unit 5, or may use an air blowing unit other than the air blowing unit 5. For example, as the air blowing unit other than the air blowing unit 5, the application system 1 may use an air blowing unit that can blow air onto the entire glass sheet 10 to perform the air drying step.

Furthermore, in step S101, the ejection portion 2 of the application system 1 may apply the functional liquid to the first side 11 using a method similar to that for applying the functional liquid to the second side 13 in step S103. In this case, for example, the application system 1 controls the robot arm 4 to move the glass sheet 10 closer to the nozzle 22 along the direction in which the nozzle 22 ejects the functional liquid. Accordingly, the distance between the nozzle 22 and the glass sheet 10 becomes shorter, and thus the application system 1 can cause the application position where the functional liquid ejected from the nozzle 22 hits to be moved upward. That is to say, the application system 1 can cause the position to which the functional liquid is to be ejected to be moved upward on the first face 15 of the glass sheet 10, without moving the glass sheet 10 downward.

Figure 9:
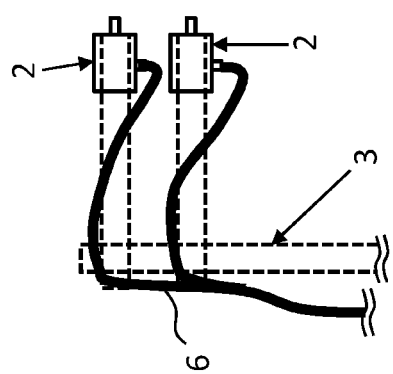
FIG. 9 shows an example of ejection portions according to another embodiment.

Furthermore, as shown in the example in FIG. 9, the application system 1 may include a plurality of ejection portions 2. FIG. 9 shows an example in which the application system 1 includes a plurality of ejection portions 2. In this case, for example, the plurality of ejection portions 2 (two ejection portions 2 in FIG. 9) may be arranged along the upper-lower direction. The application system 1 may cause the position to which the functional liquid is to be ejected to be moved in the upper-lower direction on the first face 15 using the plurality of ejection portions 2 arranged along the upper-lower direction in this manner. At this time, the application system 1 can eject the functional liquid in the upper-lower direction to the first face 15, without moving the glass sheet 10 to change the position to which the functional liquid is to be ejected, as in steps S101 and S103 above.

Furthermore, the application system 1 may cause the position to which the functional liquid is to be ejected to be moved in the upper-lower direction on the first face 15 of the glass sheet 10, by changing the force at which the functional liquid is ejected from the ejection portion 2. For example, the application system 1 may cause the position to which the functional liquid is to be ejected downward on the first face 15, by reducing the force at which the functional liquid is ejected from the ejection portion 2. Furthermore, the application system 1 may cause the position to which the functional liquid is to be ejected to be moved upward on the first face 15, by increasing the force at which the functional liquid is ejected from the ejection portion 2. Also in this case, as in the example in FIG. 9, the application system 1 can eject the functional liquid in the upper-lower direction to the first face 15, without moving the glass sheet 10 to change the position to which the functional liquid is to be ejected, as in steps S101 and S103 above.

Furthermore, the application system 1 may apply the application liquid to the entire first face 15 without providing a certain region in which the functional liquid is not to be applied at the upper side 12, or the application system 1 may provide a region in which the application liquid is not to be applied in addition to the vicinity of the upper edge 12. With this regard, the application system 1 may eject the functional liquid not only to the regions near the first side 11, the upper side 12, and the second side 13, but also to other regions on the first face 15.

Furthermore, the application system 1 may form a coating on both of the first face 15 and the second face 16, or may form a coating on the second face 16 without forming a coating on the first face 15. The application system 1 applies the functional liquid to at least one of the faces of the glass sheet 10.

Furthermore, the angle at which the robot arm 4 of the application system 1 holds the glass sheet 10 is not limited to those described above, and may be, for example, a vertical angle. With this configuration, the functional liquid is applied to the glass sheet 10 in a state of standing in the vertical direction. Accordingly, the functional liquid ejected onto the first face 15 of the glass sheet 10 flows downward easily, so that, in the flow-coating method as described above, the time necessary to apply the functional liquid can be shortened. Note that, in the foregoing embodiment, the angle of the glass sheet 10 was described based on the portion sucked by the suction cup 41 of the robot arm 4. However, the angle of the glass sheet 10 may be described based on other criteria.

Figure 13:
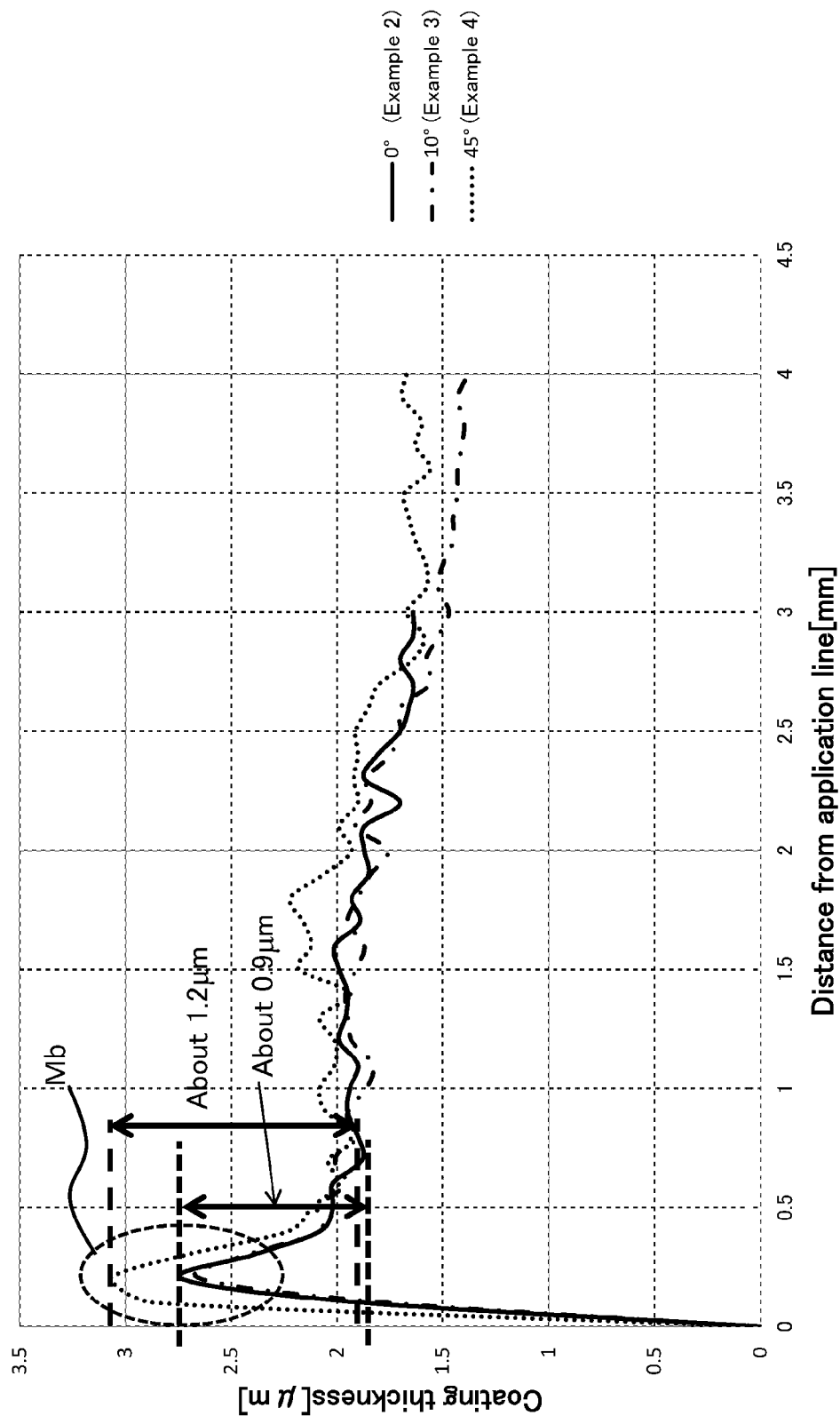
FIG. 13 is a graph showing the coating thicknesses near the application line when air was blown after the functional liquid was ejected.

Furthermore, when applying the functional liquid along the upper side 12 in step S102, the angle D at which the robot arm 4 of the application system 1 holds the glass sheet 10 may be +10 degrees to −10 degrees. Accordingly, as shown in FIG. 13 described later, a difference in coating thickness near the application line can be suppressed compared with that in the foregoing embodiment. Accordingly, distortion of the application line can be further suppressed, and the appearance at the application line can be improved.

Furthermore, if the application system 1 applies the functional liquid to the entire first face 15, instead of not applying the functional liquid to a certain region at the upper side 12, the angle D at which the robot arm 4 holds the glass sheet 10 may be −30 degrees to −60 degrees. Accordingly, the second face 16 is positioned above the first face 15, and thus a situation can be suppressed in which the functional liquid ejected onto the first face 15 flows around to the second face 16. Accordingly, the appearance of the glass sheet 10 after application of the functional liquid can be improved.

Furthermore, in step S102 described above, the application system 1 causes the functional liquid ejected onto a partial region of the glass sheet 10 to flow to other regions of the glass sheet 10, thereby applying the functional liquid to the predetermined region on the first face 15 of the glass sheet 10. However, instead of applying the functional liquid in this manner, the application system 1 may eject the functional liquid onto the entire region to which the functional liquid is to be applied, by moving the glass sheet 10 as appropriate.

Furthermore, in the operation that applies the functional liquid, the application system 1 may apply the functional liquid to a face of the glass sheet 10 in a state where the upper side of the glass sheet 10 is oriented downward in the vertical direction and the glass sheet 10 is inclined toward the nozzle 22 with respect to the vertical direction (the angle D has a negative value). Note that the state in which the glass sheet 10 is inclined toward the nozzle 22 with respect to the vertical direction refers to a state in which the angle D shown in the example in FIG. 4 has a negative value. Accordingly, flowing of the ejected functional liquid around to the second face 16 can be suppressed during application of the functional liquid to the first face 15. Note that, in order to suppress flowing of the functional liquid around to the second face, for example, the angle D is preferably set to −30 to −70.

Figure 10:
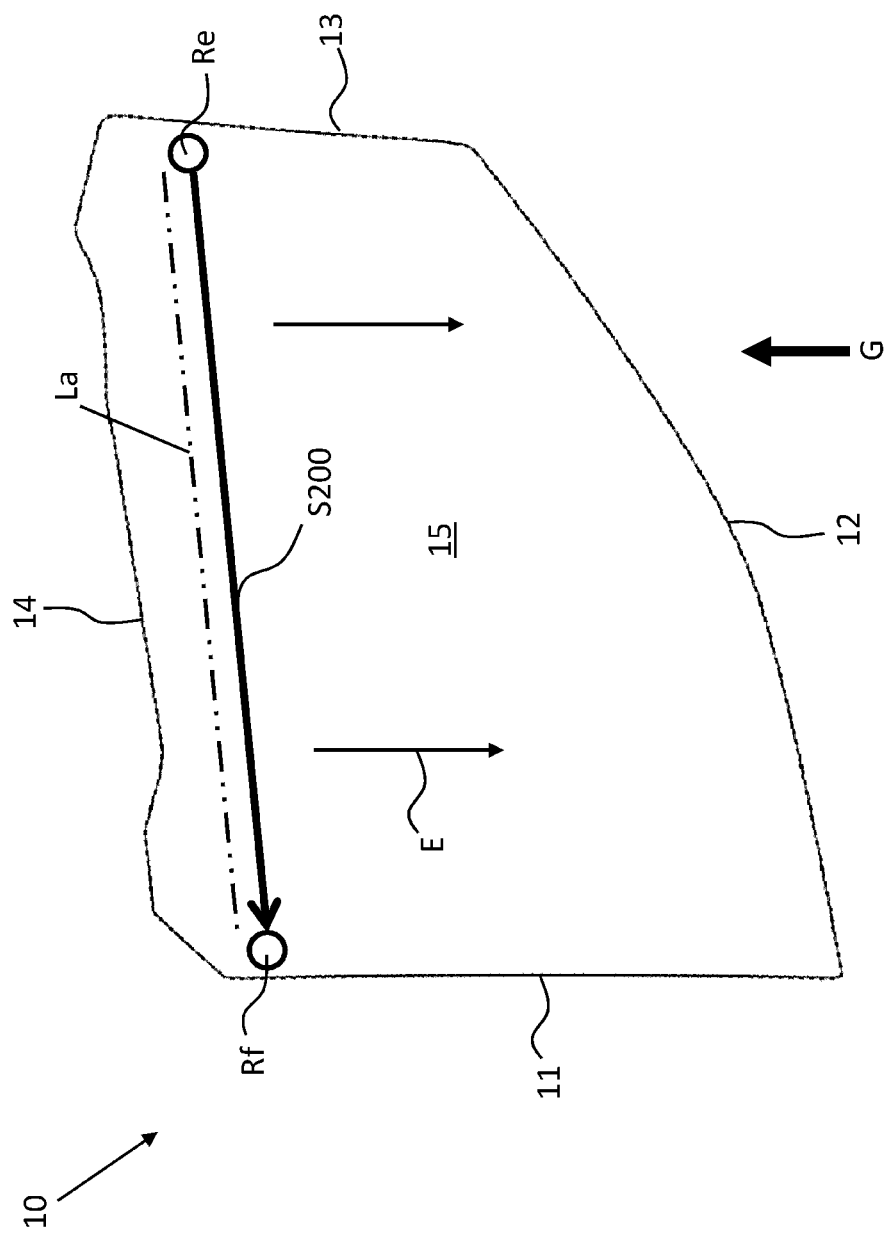
FIG. 10 shows an example of a functional liquid application step according to another embodiment.

FIG. 10 shows an example of a step of applying the functional liquid in a state where the upper side of the glass sheet 10 is oriented downward in the vertical direction. In the example shown in FIG. 10, step S200 is substantially the same as step S102. In step S200, the application system 1 applies the functional liquid so as to form an application line La. The application line La is formed so as to extend on the first face 15 of the glass sheet 10, along the region to which the functional liquid was ejected. The functional liquid ejected onto the application line La flows downward along the arrows E, and is thus applied to reach the upper side 12 of the glass sheet 10.

Figure 11:
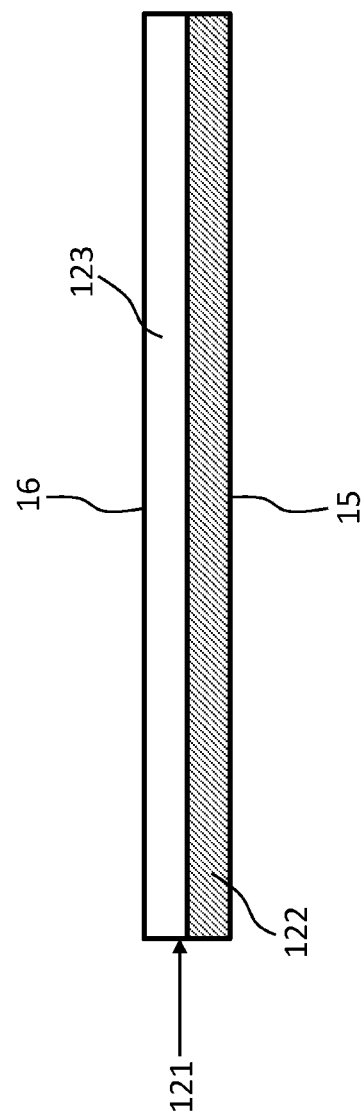
FIG. 11 shows an example of a state of the upper side of the glass sheet after the application step according to the embodiment.

FIG. 11 schematically shows an example of a state of the upper side 12 of the glass sheet 10 viewed from the arrow G in FIG. 10. The functional liquid that has flowed downward to reach the upper side 12 on the first face 15 of the glass sheet 10, flows around to an end face 121 at the upper side 12. At this time, since the glass sheet 10 is inclined toward the nozzle 22, the functional liquid flows to a partial region 122 of the end face 121 but does not flow to a remaining region 123 of the end face 121. Accordingly, in step S200, the glass sheet 10 is produced on which a coating is formed from the application line La to the partial region 122 of the end face 121 at the upper side 12 of the glass sheet 10. If the processing on the glass sheet 10 includes a step in which a robot arm or the like has to hold the end face 121, a portion on which the coating is formed becomes slippery. However, since the thus configured glass sheet 10 has the region 123 to which the functional liquid is not applied, the end face 121 can be prevented from being slippery when it is held by a robot arm or the like during the processing.

Others

In order to suppress a difference between the coating thickness on a portion to which the functional liquid is ejected and the coating thickness on a portion that the functional liquid that has flowed downward reaches, it is sufficient that the application system 1 is configured so as to blow air onto a portion to which the functional liquid as the application liquid is ejected, before the functional liquid flows downward through that portion. Accordingly, in this case, in the application system 1, the ejection portion 2 may be allowed to move without being fixed. That is to say, in this case, the application system 1 may apply the functional liquid to the glass sheet 10, while the glass sheet 10 is fixed and moving the ejection portion 2. Also, the application system 1 may apply the functional liquid to the glass sheet 10, while moving both the ejection portion 2 and the glass sheet 10.

EXAMPLES

Regarding Air Flow Orientation

First, in order to study the degree to which a difference in coating thickness can be suppressed by blowing air onto a portion to which the functional liquid was ejected on the glass sheet 10 produced by the application system 1 of the foregoing embodiment, Examples 1 to 4 below were performed. Note that the present invention is not limited to the following examples.

Example 1

First, as Example 1, an experiment was conducted to study the degree to which a difference in coating thickness occurs when the functional liquid is ejected while air is being blown from above in step S102 in FIG. 3. In Example 1, the application system 1 shown in the example in FIG. 2 was used, and an ultraviolet-protection coating liquid having the composition shown in Table 1 was used as the functional liquid for application on the glass sheet 10. Furthermore, the robot arm 4 held the glass sheet 10 such that the angle formed with respect to the vertical direction was 0 degrees, and moved the glass sheet 10 held thereby at a speed of 20 to 40 mm/s. Furthermore, the ejection portion 2 ejected the functional liquid from the nozzle 22 to the glass sheet 10 at 2 g (gram) per second. Then, as shown in FIG. 8, air was blown at 0.8 m/s from above onto the glass sheet 10.

TABLE 1

| | | | Component | | | | |
|---|---|---|---|---|---|---|---|
| Non-silicone surfactant | Triethylene glycol | Mixed solvent AP-7 | Water | Concentrated hydrochloric acid | TEOS | GPTMS | Ultraviolet absorber TINUVIN360 |
| Weight wt % 0.1 | 0.5 | 12.8 | 17.0 | 0.03 | 30.0 | 0.6 | 39.0 |

Note that the mixed solvent AP-7 is a mixed liquid containing 85.5 wt % of ethanol, 8.6 wt % of n-propanol, and 4.8 wt % of i-propanol. GPTMS is γ-glycidoxypropyltrimethoxysilane TEOS is tetraethoxysilane. Furthermore, the "ultraviolet absorber TINUVIN360" is a liquid obtained by dispersing the ultraviolet absorber TINUVIN at a concentration of 3.6 wt % in water.

Examples 2 to 4

Next, as Examples 2 to 4, an experiment was conducted to study the degree to which a difference in coating thickness occurs when air is blown from the front onto a portion to which the functional liquid was ejected in step S102 in FIG. 3. In Examples 2 to 4, the application system 1 shown in the example in FIG. 2 was used, and the liquid that was the same as that in Example 1 (Table 1) was used as the functional liquid for application on the glass sheet 10. Furthermore, the robot arm 4 moved the glass sheet 10 held thereby at a speed of 45 mm/s, and the ejection portion 2 ejected the functional liquid from the nozzle 22 to the glass sheet 10 at 2 g (gram) per second. Furthermore, the air blowing unit 5 blew air at 2 m/s from the front of the glass sheet 10 onto the air-blown region T in the shape of a rectangle having a length in the horizontal direction (the left-right direction in FIG. 5B) of 1050 mm and a length in the vertical direction (the upper-lower direction in FIG. 5B) of 300 mm. In Examples 2 to 4, the degree to which a difference in coating thickness occurred was studied while causing the robot arm 4 to hold the glass sheet 10 respectively at an angle with respect to the vertical direction of 0 degrees, 10 degrees, and 45 degrees.

Figure 12:
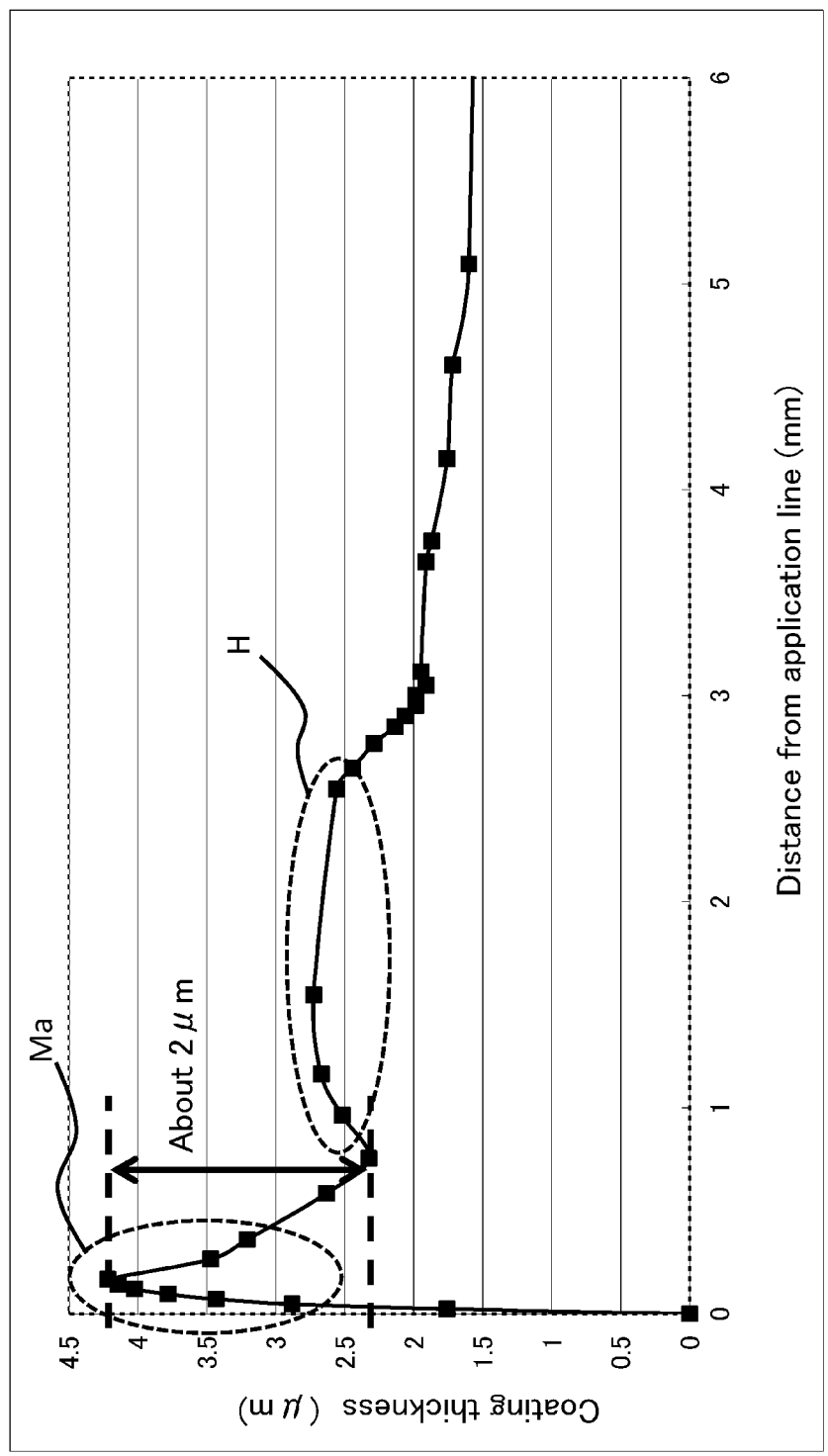
FIG. 12 is a graph showing the coating thickness near an application line when the functional liquid was applied while air was being blown from above onto the glass sheet.

The glass sheets 10 respectively used in Examples 2 to 4 have a size of 600 mm×600 mm. In Examples 2 to 4, the application system 1 stopped the movement of the glass sheet 10 for 5 seconds after the application position reached the region Rc, and blew air from the air blowing unit 5 onto the glass sheet 10. Accordingly, for example, regarding a position shifted from the first side 11 by 300 mm toward the second side 12, air from the air blowing unit 5 was blown onto that position while the glass sheet 10 was moving for the remaining 300 mm and the glass sheet 10 was stopped for 5 seconds. That is to say, air was blown onto that position for approximately 11.7 seconds.
Results FIG. 12 shows the coating thickness near the application line L when the functional liquid was ejected while air was being blown from above (Example 1). FIG. 13 shows the coating thicknesses near the application line L when air was blown from the front after the functional liquid was ejected (Examples 2 to 4). FIG. 13 shows the coating thicknesses when the glass sheet 10 was inclined at an angle D of 0 degrees (Example 2), 10 degrees (Example 3), and 45 degrees (Example 4). On the glass sheet 10 shown in the example in FIG. 3, in step S102, the functional liquid ejected to form the application line L was caused to flow downward, and thus the functional liquid was applied to the first face 15.

Accordingly, the distance from the application line in FIGS. 12 and 13 indicates the distance downward from the application line L shown in the example in FIG. 3. In Examples 1 to 4, the coating thicknesses were measured using a laser microscope (VK-9500 manufactured by Keyence Corporation).

In Examples 1 to 4, undulation of the application liquid generated when applying the functional liquid to the glass sheet 10 hardly occurred. However, the thicknesses of the functional liquid coatings formed on the glass sheet 10 were different between the examples as follows.

That is to say, as shown in a region Ma in the example in FIG. 12, when the functional liquid was ejected while air was being blown from above (Example 1), the functional liquid was dried in a short time, and a difference in coating thickness of about 2 μm occurred in a region within 1 mm from the application line L, in particular, in a region at and after a point where a local maximum of the coating thickness appeared first in an area extending downward from the application line L. On the other hand, as shown in a region Mb in the example in FIG. 13, when air was blown from the front onto the glass sheet 10 inclined at 0 degrees or 10 degrees with respect to the vertical direction after the functional liquid was ejected (Examples 2 and 3), the difference in coating thickness was about 0.9 μm in a region within 1 mm from the application line L, in particular, in a region at and after a point where a local maximum of the coating thickness appeared first in an area extending downward from the application line L. That is to say, under the above-described conditions, if air was brown from the front onto the glass sheet 10 after the functional liquid was applied, a difference in coating thickness was suppressed by at least about 1.1 μm. When the glass sheet 10 was inclined at 45 degrees with respect to the vertical direction (Example 4), the difference in coating thickness was largest. However, even in this case, the difference in coating thickness in a region within 1 mm from the application line L was about 1.2 μm.

TABLE 2

| Difference in coating thickness | Appearance |
|---|---|
| 0.9 μm | Good |
| 1.2 μm | Good |
| 2.0 μm | Poor |

The appearance of the coating was checked in the portions where such a difference in coating thickness occurred. Table 2 shows appearance results. As shown in Table 2, when air was blown from the front onto the glass sheet 10 after the functional liquid was applied, the influence of the difference in coating thickness was small, and the appearance of the coating was good. On the other hand, when the functional liquid was applied while air was being blown from above onto the glass sheet 10, the appearance of the coating was poor due to the influence of a difference in coating thickness of about 2.0 μm. That is to say, a comparison between Example 1 and Examples 2 to 4 shows that, if the difference in coating thickness can be suppressed to about 1.2 μm, distortion generated in the coating can be suppressed, and the appearance of the coating can be improved.

Furthermore, as shown in a region H in the example in FIG. 12, when the functional liquid is applied while air is being blown from above onto the glass sheet 10, a region such as a hill having a relatively large coating thickness (hereinafter, referred to as a "hill region") is partially generated. In Examples 2 to 4, the maximum coating thickness near the application line L was 3 μm (when the angle was 45 degrees) as shown in the example in FIG. 13, whereas, in Example 1, the maximum coating thickness near the application line L was 4.2 μm as shown in the example in FIG. 12. That is to say, when the functional liquid was applied while air was being blown from above onto the glass sheet 10, the coating thickness near the application line L increased.

It seems that this hill region was generated due to the influence of this aspect. That is to say, it seems that this hill region was generated due to the fact that the drying of the functional liquid ejected to form the application line L was facilitated only at a partial region of the application line L, and the functional liquid ran down from this partial region. On the other hand, as shown in the example in FIG. 13, when air was blown from the front after the functional liquid was ejected, such a hill region was not generated. In particular, when air was blown within 60 seconds after the functional liquid was ejected, such a hill region was properly prevented from being generated. Accordingly, it was seen that blowing air after ejecting the functional liquid is effective for suppressing a difference in coating thickness, but, if air is blown excessively, adverse effects may occur.

These results show that, if air is properly blown after the functional liquid is ejected, the difference in coating thickness in a region within 1 mm from the application line L can be suppressed, and a hill region can be prevented from being generated. Accordingly, distortion generated in the functional liquid coating can be suppressed, and the appearance near the application line L can be improved.

Under the conditions shown in the example in FIG. 13, glass sheets 10 were produced on which the difference in coating thickness in a region extending downward within 1 mm from the application line L was suppressed to 1.2 μm or less. In particular, when the angle D of the glass sheet 10 was set to 10 degrees, a glass sheet 10 was produced on which the difference in coating thickness in a region extending downward within 1 mm from the application line L was suppressed to 1 μm or less. On such a glass sheet 10, the difference between the coating thickness near the application line L is suppressed, and thus distortion due to the difference in coating thickness is suppressed, and the appearance near the application line L is good. Accordingly, when changing these conditions, the conditions may be adjusted so that such a glass sheet 10 as described above can be produced. For example, the amount of functional liquid applied, the angle D of the glass sheet 10, the amount of air blown from the air blowing unit 5, and the like may be adjusted such that a glass sheet 10 is produced on which the difference in coating thickness in a region extending downward within 1 mm from the application line L is suppressed to 1.2 μm or less.

Other Conditions

Next, the coating thickness was checked while changing various conditions to produce glass sheets 10 according to Examples 5 to 10 below, except for the direction in which air was blown onto the glass sheets 10 after the functional liquid was applied.

Specifically, the glass sheets 10 according to Examples 5 to 10 were produced by performing steps S101 to S103 described in the foregoing embodiment using the application system 1 shown in the example in FIG. 2. In Examples 5 to 7, the functional liquid that was the same as that Example 1 (Table 1) was applied. On the other hand, in Examples 8 to 10, an ultraviolet-protection coating liquid having the composition shown in Table 3 below was applied to the glass sheet 10 as the functional liquid.

TABLE 3

| | Component | | | | | | | |
|---|---|---|---|---|---|---|---|---|
| | Non-silicone surfactant | Triethylene glycol | Mixed solvent AP-7 | Water | Concentrated hydrochloric acid | TEOS | GPTMS | Ultraviolet absorber TINUVIN360 |
| Weight wt % | 0.2 | 0.5 | 12.7 | 17.0 | 0.03 | 30.0 | 0.6 | 39.0 |

In Examples 5 to 10, the robot arm 4 held the glass sheet 10 such that the angle formed with respect to the vertical direction was 10 degrees, and moved the glass sheet 10 held thereby at a speed of 60 mm/s. Furthermore, in Examples 5 to 10, the ejection portion 2 ejected the functional liquid from the nozzle 22 to the glass sheet 10 at 3.5 g per second. Then, in Examples 5 to 10, air was blown from the front of the glass sheet 10 onto the portion to which the functional liquid was ejected in step S102 in FIG. 3.

In Example 5, air was blown at a speed of 3 m/s onto a portion to which the functional liquid was ejected, after 1.5 seconds after the functional liquid was applied. In Example 6, air was blown at a speed of 2 m/s onto a portion to which the functional liquid was ejected, 2 seconds after the functional liquid was applied. In Example 7, air was blown at a speed of 3.2 m/s onto a portion to which the functional liquid was ejected, after 1.5 seconds after the functional liquid was applied. In Examples 8 to 10, air was blown at a speed of 2.5 m/s onto portions to which the functional liquid was ejected, after 2 seconds after the functional liquid was applied.

Results

Figure 14:
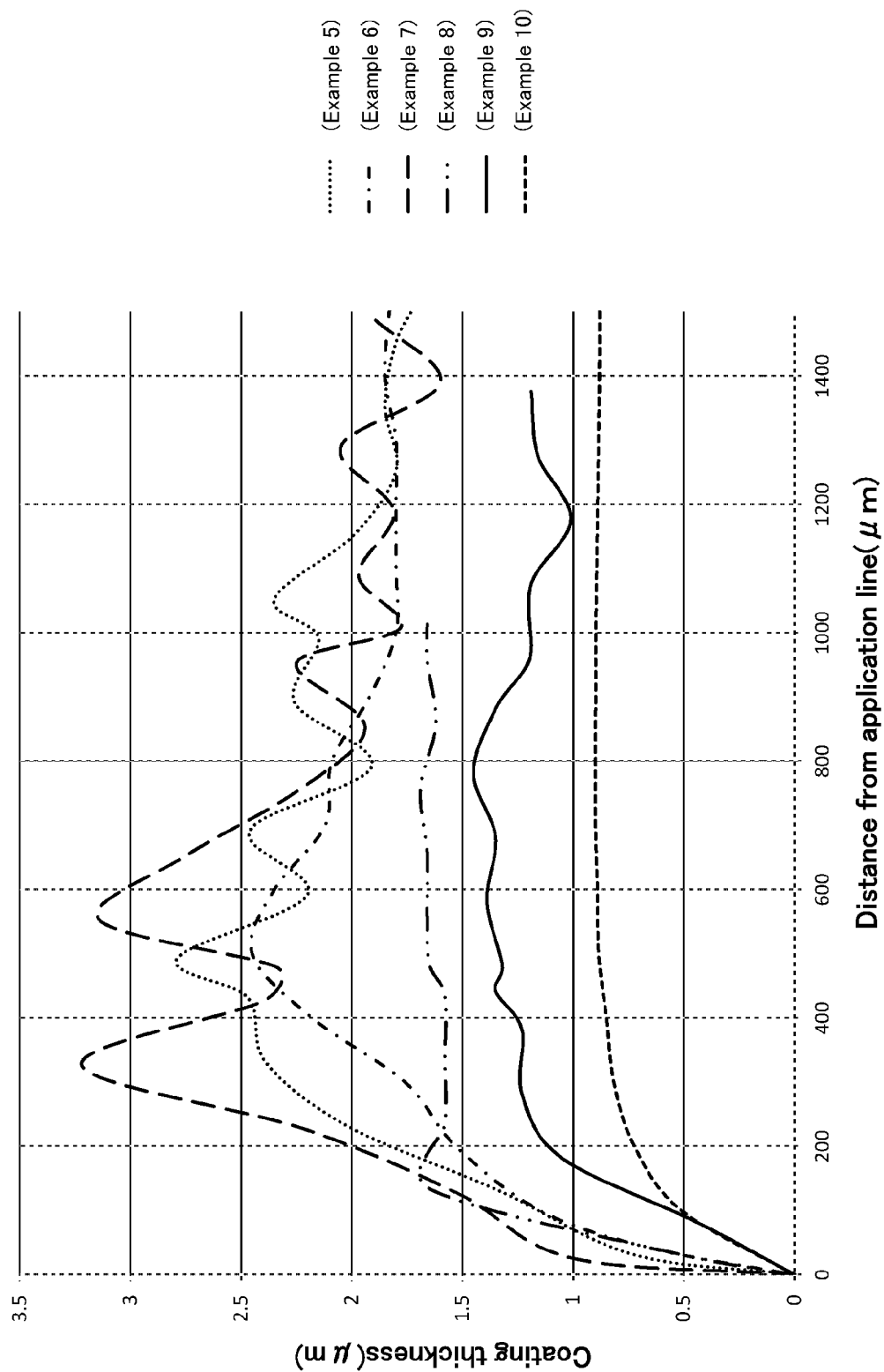
FIG. 14 is a graph showing the coating thicknesses near the application line when air was blown after the functional liquid was ejected.

FIG. 14 shows the coating thicknesses near the application line L in Examples 5 to 10. As in Examples 1 to 4, in step S102, the functional liquid ejected to form the application line L was caused to flow downward, so that the functional liquid was applied to the first face 15. Accordingly, the distance from the application line in FIG. 14 indicates the distance downward from the application line L shown in the example in FIG. 3. In Examples 5 to 10, the coating thicknesses were measured using a laser microscope (VK-9500 manufactured by Keyence Corporation).

Also in Examples 5 to 10, undulation of the application liquid generated when applying the functional liquid to the glass sheet 10 hardly occurred as in Examples 1 to 4. However, the thicknesses of the functional liquid coatings formed on the glass sheet 10 were different between the examples as follows.

That is to say, as shown in the example in FIG. 14, the local maximum that appeared in the coating thickness first in the direction in which the functional liquid flowed from the application line was the largest at 3.2 μm in the case of Example 7. Accordingly, in Examples 5 to 10, glass sheets 10 were produced on which the local maximum that appeared in the coating thickness first in the direction in which the functional liquid flowed from the application line was suppressed to 3.2 μm or less.

The functional liquid coating is formed, as described above, by causing the functional liquid to flow downward from the application line. Accordingly, the coating hardly forms on the opposite side of the direction in which the functional liquid flows, that is, on the side above the application line, and the coating appears from a region near the application line. Accordingly, if the local maximum that appears in the coating thickness first in the direction in which the functional liquid flows downward from the application line is large, a gap between an upper region without the coating and a region having this local maximum increases. Thus, light that is transmitted through the glass sheet is likely to be refracted, and the appearance near the application line may be poor. For example, in Example 1, the local maximum that appeared in the coating thickness first in the direction in which the functional liquid flowed from the application line was 4.2 μm, that is, the appearance near the application line was poor.

On the other hand, in Examples 5 to 10 and Examples 2 to 4, the local maximum that appeared in the coating thickness first in the direction in which the functional liquid flowed from the application line was suppressed to 3.2 μm or less, that is, the appearance near the application line was improved compared with that in Example 1. In particular, in Examples 2, 3, 5, 6, and 8 to 10, the local maximum was suppressed to 2.8 μm or less, that is, the appearance near the application line was significantly improved compared with that in Example 1.

Furthermore, a comparison between the appearances near the application lines in Examples 5 to 10 shows that the appearance at the application line was better in Examples 6 and 8 to 10 than in Examples 5 and 7. The reason for this seems to be as follows. That is to say, in Examples 5 and 7, the coating thickness varied relatively frequently in the vicinity of the application line within 1.2 mm therefrom in the direction in which the functional liquid flowed.

Specifically, in Example 5, the coating thickness had a first local maximum 2.79 μm at a position that was 0.49 mm from the application line. In the range within 0.1 mm downward from the position at the first local maximum, that is, in the range of 0.49 mm to 0.59 mm from the application line, the coating thickness varied by 0.59 μm. Furthermore, in the range within 0.1 mm upward from the position at the first local maximum, that is, in the range of 0.39 mm to 0.49 mm from the application line, the coating thickness varied by 0.36 μm. In a similar manner, in Example 5, the coating thickness had a second local maximum 2.46 μm at a position that was 0.69 mm from the application line. In the range within 0.1 mm downward from the position at the second local maximum, that is, in the range of 0.69 mm to 0.79 mm from the application line, the coating thickness varied by 0.55 μm. Furthermore, in the range within 0.1 mm upward from the position at the second local maximum, that is, in the range of 0.59 mm to 0.69 mm from the application line, the coating thickness varied by 0.26 μm.

Furthermore, in Example 7, the coating thickness had a first local maximum 3.2 μm at a position that was 0.33 mm from the application line. In the range within 0.1 mm downward from the position at the first local maximum, that is, in the range of 0.33 mm to 0.43 mm from the application line, the coating thickness varied by 0.8 μm. Furthermore, in the range within 0.1 mm upward from the position at the first local maximum, that is, in the range of 0.23 mm to 0.33 mm from the application line, the coating thickness varied by 1.0 μm. In a similar manner, in Example 7, the coating thickness had a second local maximum 3.1 μm at a position that was 0.55 mm from the application line. In the range within 0.1 mm downward from the position at the second local maximum, that is, in the range of 0.55 mm to 0.65 mm from the application line, the coating thickness varied by 0.4 μm. Furthermore, in the range within 0.1 mm upward from the position at the second local maximum, that is, in the range of 0.45 mm to 0.55 mm from the application line, the coating thickness varied by 0.8 μm.

That is to say, in Examples 5 and 7, the coating thickness varied by more than 0.25 μm in both of the ranges within 0.1 mm before and after the position at the local maximum of the coating thickness. If the coating thickness varies by more than 0.25 μm in both of the ranges within 0.1 mm before and after the position at the local maximum of the coating thickness in this manner, the projecting portion indicating the local maximum of the coating thickness has a relatively sharp shape. Accordingly, the surface of the coating formed on the face of the glass sheet 10 has a relatively sharp concave-convex shape, and light that is transmitted through the glass sheet 10 is likely to be distorted. In Examples 5 and 7, it seems that this distortion was one cause of the appearance near the application line being poor.

On the other hand, in Examples 6 and 8 to 10, there was no such variation in the coating thickness. Specifically, in Examples 6 and 8 to 10, in the vicinity of the application line within 1.2 mm therefrom in the direction in which the functional liquid flowed, the variation in the coating thickness from a local maximum was suppressed to 0.25 μm or less, the variation being generated in the range having a smaller variation amount in the coating thickness, of the range within 0.1 mm downward from the position at the local maximum of the coating thickness, in the direction in which the functional liquid flowed downward, and the range within 0.1 mm upward from the position at the local maximum of the coating thickness, in the direction in which the functional liquid flowed downward. Accordingly, in Examples 6 and 8 to 10, it seems that the coating surface does not have such a sharp concave-convex shape, and the appearance near the application line was improved compared with that in Examples 5 and 7.

Furthermore, in these examples, basically, the local maximum that appeared in the coating thickness first from the application line was significantly different from the second and subsequent local maximums of the coating thickness, and the second and subsequent local maximums of the coating thickness had similar values. For example, in Example 5, the coating thickness had a second local maximum 2.46 µm at a position that was 0.69 mm from the application line. Furthermore, for example, in Example 7, the coating thickness had a second local maximum 3.1 µm at a position that was 0.55 mm from the application line.

A study of local minimums adjacent to the local maximum of the coating thickness shows that, in the coating according to Example 5, the coating thickness had a local minimum 2.2 µm at a position that was 0.59 mm from the application line, and the coating thickness had a local minimum 1.91 µm at a position that was 0.79 mm from the application line. Accordingly, in Example 5, the differences between the local maximum that appeared in the coating thickness second in the downward direction from the application line and the local minimums adjacent to the local maximum were 0.26 µm and 0.55 µm.

In a similar manner, in the coating according to Example 7, the coating thickness had a local minimum 2.3 µm at a position that was 0.48 mm from the application line, and the coating thickness had a local minimum 1.9 µm at a position that was 0.89 mm from the application line. Accordingly, in Example 7, the differences between the local maximum that appeared in the coating thickness second in the downward direction from the application line and the local minimums adjacent to the local maximum were 0.8 µm and 1.2 µm.

In Examples 5 and 7, the differences between the local maximums that appeared in the coating thickness third and thereafter from the application line and the local minimums adjacent to the local maximums were relatively large. That is to say, in Examples 5 and 7, in the vicinity of the application line within 1.2 mm therefrom in the direction in which the functional liquid flowed downward, the differences between the local maximums that appeared in the coating thickness second and thereafter from the application line in the direction in which the functional liquid flowed downward and the local minimums adjacent to the local maximums that appeared in the coating thickness second and thereafter were relatively large. It seems that, due to this aspect, a sharp concave-convex coating surface was formed over a wide range from the application line in the direction in which the functional liquid flowed downward, and the appearance near the application line became poor.

On the other hand, in Examples 6 and 8 to 10, there was no such variation in the coating thickness, and, in the vicinity of the application line within 1.2 mm therefrom in the direction in which the functional liquid flowed downward, the differences between the local maximums that appeared in the coating thickness second and thereafter from the application line in the direction in which the functional liquid flowed downward and the local minimums adjacent to the local maximums that appeared in the coating thickness second and thereafter were suppressed to 0.3 µm or less. It seems that, due to this aspect, such a sharp concave-convex coating surface was not formed in Examples 6 and 8 to 10, and a coating is formed in which the appearance near the application line was better than that in Examples 5 and 7.

Furthermore, in Examples 8 to 10, the variation in the coating thickness in the region immediately after the application line (e.g., 0 µm to 200 µm from the application line) was gentle compared with that in Examples 1 to 7. One reason for this seems to be as follows. That is to say, the functional liquid used in Examples 8 to 10 contained a larger amount of surfactant than that in Examples 1 to 7. Accordingly, compared with the functional liquid used in Examples 1 to 7, the functional liquid used in Examples 8 to 10 had a lower surface tension, and was likely to flow downward on the surface of the glass sheet 10. It seems that, due to this aspect, a coating was formed in which the variation in the coating thickness in the region immediately after the application line was gentle in Examples 8 to 10.

Furthermore, in Examples 5 and 7 in which air was blown at an earlier point in time, the local maximum that appeared in the coating thickness first from the application line of the coating formed on the glass sheet 10 was larger than that in Examples 6 and 8 to 10. One reason for this seems to be as follows. That is to say, if the time from when the functional liquid is applied to when air is blown is short, the functional liquid is highly likely to be dried before the functional liquid flows sufficiently downward from the application line. It seems that, due to this aspect, if air is blown at an earlier point in time, the local maximum that appears in the coating thickness first from the application line on the coating formed on the glass sheet 10 becomes large.

Furthermore, a comparison between Examples 5 and 7 having different conditions regarding air speeds shows that, in Example 7 in which the speed of air blown onto the portion to which the functional liquid was applied was high, the local maximum that appeared in the coating thickness first from the application line on the coating formed on the glass sheet 10 was larger than that in Example 5. One reason for this seems to be as follows. That is to say, if the intensity (speed) of air blown onto the portion to which the functional liquid was applied is increased, the functional liquid is dried in a shorter time. Accordingly, the functional liquid is highly likely to be dried before the functional liquid flows sufficiently downward from the application line. It seems that, due to this aspect, if the intensity (speed) of air blown onto the portion to which the functional liquid was applied is increased, the local maximum that appears in the coating thickness first from the application line on the coating formed on the glass sheet 10 becomes large.

REFERENCE SIGNS LIST

1 Application system
2 Ejection portion
21 Base portion
22 Nozzle
23 Connection portion
3 Fixing member
31 Catch portion
32 First plate member
33 Second plate member
4 Robot arm
41 Suction cup
5 Air blowing unit
6 Tube member
10 Glass sheet
11 First side
12 Upper side
13 Second side
14 Lower side
15 First face
16 Second face

The invention claimed is:

1. A method for producing a glass sheet with a coating, produced by applying a functional liquid for providing a function to the glass sheet, to at least one face of the glass sheet, comprising:

a first step of supplying the functional liquid to an ejection portion having a nozzle that ejects the functional liquid toward the glass sheet; and a second step of applying the functional liquid to the glass sheet while moving the glass sheet relative to the ejection portion in a fixed state such that the functional liquid ejected from the nozzle is applied to a predetermined region on the at least one face of the glass sheet;

wherein a tube member that transports the functional liquid is connected to the ejection portion, the tube member is made of a soft material, in the first step, the functional liquid is supplied by the tube member to the ejection portion, and and in the second step, the functional liquid is applied to the face of the glass sheet by causing the functional liquid ejected onto the face of the glass sheet to flow downward, wherein the produced glass with a coating comprises a glass sheet;

an application line formed in a step in which a functional liquid for providing a function to the glass sheet is deposited on a face of the glass sheet, the application line being on the face of the glass sheet along a region to which the functional liquid was ejected; and a coating formed by having the deposited functional liquid spread on the face of the glass sheet and along a first direction from the application line, thereby covering a portion of the face of the glass sheet, wherein a coating thickness of the formed coating is more than 0.5 μm and is equal to or less than 3.2 μm in a whole range of 0.2 mm to 1.2 mm in the first direction from the application line, wherein the formed coating in a vicinity within 1.2 mm of the application line in the first direction includes one or more positions each having a local maximum of a coating thickness, wherein the one or more positions include a nearest position to the application line, and wherein the formed coating in a vicinity within 1.2 mm of the application line in the first direction is such that a smaller variation in the coating thickness from the local maximum at the nearest position is suppressed to 0.25 μm or less, the smaller variation being the smaller one of a first variation located within a first region and a second variation located within a second region, the first region being defined by a range within 0.1 mm of the nearest position in the first direction, the second region being defined by a range within 0.1 mm of the nearest position in a second direction, the second direction being opposite to the first direction.

2. The method for producing a glass sheet according to claim 1, further comprising:

a third step of, after the functional liquid is ejected onto the face of the glass sheet in the second step, blowing air onto the portion to which the functional liquid was ejected.

3. The method for producing a glass sheet according to claim 1, wherein, in the second step, the functional liquid is applied to the face of the glass sheet in a state where an upper side of the glass sheet is oriented downward in a vertical direction and the glass sheet is inclined toward the nozzle with respect to the vertical direction.

4. The method for producing a glass sheet according to claim 1, wherein, in the second step, the functional liquid is applied in an upper-lower direction of the glass sheet, by moving the glass sheet closer to or away from the nozzle in a direction in which the nozzle ejects the functional liquid.

5. The method for producing a glass sheet according to claim 1, wherein an application start region from which application of the functional liquid is started is defined on the face of the glass sheet, and in the second step, after the glass sheet has moved to a position where the functional liquid ejected from the nozzle will hit the application start region, ejection of the functional liquid from the nozzle is started.

6. The method for producing a glass sheet according to claim 1, wherein, in the second step, an application line along a region onto which the functional liquid was ejected is formed on the face of the glass sheet, and the application line is formed along at least part of a peripheral edge of the glass sheet.

7. A coated glass sheet, comprising:

a glass sheet;

an application line formed in a step in which a functional liquid for providing a function to the glass sheet is deposited on a face of the glass sheet, the application line being on the face of the glass sheet along a region to which the functional liquid was ejected; and a coating formed by having the deposited functional liquid spread on the face of the glass sheet and along a first direction from the application line, thereby covering a portion of the face of the glass sheet, wherein a coating thickness of the formed coating is more than 0.5 μm and is equal to or less than 3.2 μm in a whole range of 0.2 mm to 1.2 mm in the first direction from the application line, wherein the formed coating in a vicinity within 1.2 mm of the application line in the first direction includes one or more positions each having a local maximum of a coating thickness, wherein the one or more positions include a nearest position to the application line, and wherein the formed coating in a vicinity within 1.2 mm of the application line in the first direction is such that a smaller variation in the coating thickness from the local maximum at the nearest position is suppressed to 0.25 μm or less, the smaller variation being the smaller one of a first variation located within a first region and a second variation located within a second region, the first region being defined by a range within 0.1 mm of the nearest position in the first direction, the second region being defined by a range within 0.1 mm of the nearest position in a second direction, the second direction being opposite to the first direction.

* * * * *